US010169301B1

(12) United States Patent
Zeevi

(10) Patent No.: US 10,169,301 B1
(45) Date of Patent: Jan. 1, 2019

(54) INTEGRATED DOCUMENT EDITOR

(71) Applicant: Eli I Zeevi, San Francisco, CA (US)

(72) Inventor: Eli I Zeevi, San Francisco, CA (US)

( * ) Notice: Subject to any disclaimer, the term of this patent is extended or adjusted under 35 U.S.C. 154(b) by 0 days.

(21) Appl. No.: 13/955,288

(22) Filed: Jul. 31, 2013

Related U.S. Application Data

(60) Division of application No. 13/092,114, filed on Apr. 21, 2011, now Pat. No. 8,548,239, which is a continuation of application No. 11/144,492, filed on Jun. 2, 2005, now Pat. No. 7,961,943.

(51) Int. Cl.
*G06F 3/041* (2006.01)
*G06F 17/21* (2006.01)

(52) U.S. Cl.
CPC .................. *G06F 17/212* (2013.01)

(58) Field of Classification Search
CPC .......... G06F 3/04883; G06F 2203/048; G06K 9/222
USPC .................. 382/173.187, 186, 189, 311, 228
See application file for complete search history.

(56) References Cited

U.S. PATENT DOCUMENTS

| | | | |
|---|---|---|---|
| 755,187 A * | 3/1904 | Thielens | B21F 27/08 140/116 |
| 5,157,737 A | 10/1992 | Sklarew | |
| 5,365,598 A | 11/1994 | Sklarew | |
| 5,666,139 A * | 9/1997 | Thielens | G06F 17/24 345/173 |
| 5,768,418 A | 6/1998 | Berman et al. | |
| 6,064,751 A | 5/2000 | Smithies et al. | |
| 6,167,376 A | 12/2000 | Ditzik | |
| 6,230,169 B1 * | 5/2001 | Nagae | G06F 17/241 715/203 |
| 6,339,395 B1 | 1/2002 | Hazumi et al. | |
| 6,396,598 B1 | 5/2002 | Kashiwagi et al. | |
| 6,408,092 B1 | 6/2002 | Sites | |
| 6,415,256 B1 | 7/2002 | Ditzik | |
| 6,493,702 B1 * | 12/2002 | Adar | G06F 17/30884 707/706 |
| 6,539,363 B1 | 3/2003 | Allgeier et al. | |

(Continued)

OTHER PUBLICATIONS

F. Kimura* and M. Shridhar, "Handwritten Numerical Recognition Based Onmultiple Algorithms" Pattern Recognition, vol. 24, No. 10. pp. 969-983, 1991.*

(Continued)

*Primary Examiner* — Mekonen Bekele
(74) *Attorney, Agent, or Firm* — Ziegler IP Law Group, LLC

(57) ABSTRACT

Provided are methods and computing devices wherein in one embodiment, user input on a touch screen of a computing device within which a text document is displayed is associated with both: a) a user chosen command, such as a selection or an insertion of text characters, to be applied within the document, and b) a positional location in the document, representing a user chosen document location. A region associated with the positional location in the document is defined, and data comprises representation of the user chosen command is processed to determine the user chosen document location, being within the region and in proximity to the positional location in the document, based on the document location being capable of being either starting location or ending location within user chosen locations in the document at which to apply the user chosen command.

44 Claims, 35 Drawing Sheets

(56) References Cited

U.S. PATENT DOCUMENTS

| | | |
|---|---|---|
| 6,600,834 B1 | 7/2003 | Su et al. |
| 6,912,308 B2 | 6/2005 | Reintjes et al. |
| 6,931,153 B2 | 8/2005 | Nakao et al. |
| 6,941,507 B2 | 9/2005 | Iwema et al. |
| 7,039,234 B2 | 5/2006 | Geidl et al. |
| 7,106,312 B2 * | 9/2006 | Pennington, II .... G06F 3/04883 345/157 |
| 7,120,872 B2 * | 10/2006 | Thacker ................ G06F 3/0481 715/209 |
| 7,322,008 B2 * | 1/2008 | Thacker ................ G06F 3/0481 382/186 |
| 7,353,453 B1 | 4/2008 | Simmons |
| 7,461,348 B2 | 12/2008 | Clow et al. |
| 7,461,789 B2 | 12/2008 | Katsurabayashi et al. |
| 7,506,271 B2 | 3/2009 | Wang et al. |
| 7,535,453 B2 | 5/2009 | Lee |
| 7,551,187 B2 * | 6/2009 | Agrawala et al. ............ 345/667 |
| 7,561,145 B2 | 7/2009 | Garside et al. |
| 7,844,893 B2 * | 11/2010 | Saito ................... G06F 17/241 715/231 |
| 7,961,943 B1 * | 6/2011 | Zeevi ................... G06F 3/0412 345/173 |
| 8,074,184 B2 * | 12/2011 | Garside ............... G06F 3/04883 382/186 |
| 8,253,708 B2 * | 8/2012 | Garside ............... G06F 3/03545 345/173 |
| 8,548,239 B1 * | 10/2013 | Zeevi ................. G06F 3/04883 382/173 |
| 2002/0035697 A1 | 3/2002 | McCurdy et al. |
| 2003/0007018 A1 | 1/2003 | Seni et al. |
| 2003/0016873 A1 | 1/2003 | Nagel et al. |
| 2003/0185444 A1 | 10/2003 | Honda |
| 2003/0214531 A1 * | 11/2003 | Chambers et al. ............ 345/764 |
| 2003/0215139 A1 | 11/2003 | Shilman et al. |
| 2003/0215142 A1 | 11/2003 | Gounares et al. |
| 2004/0001627 A1 * | 1/2004 | Simmons .............. G06F 17/242 382/186 |
| 2004/0070573 A1 | 4/2004 | Graham |
| 2004/0093568 A1 | 5/2004 | Lerner et al. |
| 2004/0174345 A1 * | 9/2004 | Tsang ................... G06F 3/0418 345/173 |
| 2004/0177324 A1 | 9/2004 | Simmons et al. |
| 2004/0196313 A1 * | 10/2004 | Wynn ................. G06F 17/242 715/779 |
| 2004/0225965 A1 | 11/2004 | Garside et al. |
| 2005/0114773 A1 * | 5/2005 | Thacker ................ G06F 3/0481 715/263 |
| 2005/0152602 A1 | 7/2005 | Chen et al. |
| 2005/0175242 A1 * | 8/2005 | Tanaka ................... G06K 9/222 382/187 |
| 2005/0188306 A1 | 8/2005 | Mackenzie |
| 2005/0193321 A1 | 9/2005 | Iwema et al. |
| 2006/0112349 A1 | 5/2006 | Clow et al. |
| 2006/0123159 A1 | 6/2006 | Clow et al. |
| 2006/0221064 A1 | 10/2006 | Sawada |
| 2006/0257025 A1 | 11/2006 | Simmons et al. |
| 2008/0170786 A1 | 7/2008 | Tomizawa et al. |
| 2008/0170789 A1 * | 7/2008 | Thacker ................ G06F 3/0481 382/186 |
| 2009/0161958 A1 | 6/2009 | Markiewicz et al. |

OTHER PUBLICATIONS

Hiroaki Ogata and Yoneo Yano, "Computer Supported Composition Learning with Collaborative Writing Tools", published 1997, pp. 1-8.

* cited by examiner

| Command | Examples:<br>1- Insert text, 2- Delete text, 3- Move text around, 4- Delete extra line, 5- Insert line, 6- Move Text around,<br>7- Change fonts size, 8- Change Fonts Color, 9- Change image size |
|---|---|
| Flags | Examples: Text / Image flag and Identity flag |
| x-y InsertionPoint1<br>e.g., for MS Word<br>3 Parameters:<br>IP1-Page#<br>IP1-Line#<br>IP1-Col# | Designated Location 1<br>The definition of the x-y location is application dependant<br>e.g., where insertion takes place or where selection begin<br>Page # of InsertionPoint1<br>Line # in the page of InsertionPoint1<br>Col # in the line of InsertionPoint1 |
| N1 | Length in characters from InsertionPoint1 to the right,<br>For example, for text to be selected (and then copied or deleted) |
| x-y InsertionPoint2<br>e.g., for MS Word<br>3 Parameters:<br>IP2-Page#<br>IP2-Line#<br>IP2-Col# | Designated Location 2<br>The definition of the x-y location is application dependant<br>e.g., where selection of text that moves to SelectionPoint2 begin<br>Page # of InsertionPoint2<br>Line # in the page of InsertionPoint2<br>Col # in the line of InsertionPoint2 |
| N2 | Length in characters from InsertionPoint2 to the right<br>For text selection and movement to InsertionPoint1 |
| StartTextRHI | Location of recognized text in RHI Memory (to be copied) |
| N3 | Length of text in RHI Memory in characters<br>Designates Characters to be processed or to be copied |
| Text1Attributes | Attributes of the revision based on user preferences<br>for, e.g., fonts and color revisions |
| Text2Attributes | Attributes of text inserted at InsertionPoint2<br>for, e.g., fonts and color revisions |
| StartImageRHI | Location of Image in RHI Memory |
| AttributesImageRHI | e.g., file size, frame info, dimensions |
| AttributesImageDoc | Operations to account for prior to storing in Document Memory<br>e.g., file format (e.g., jpeg), file size/resolution and frame info |

X-Y Location of InsertionPoint1 in the document memory 22

X-Y Location of InsertionPoint2 in the document memory 22

Figure 10

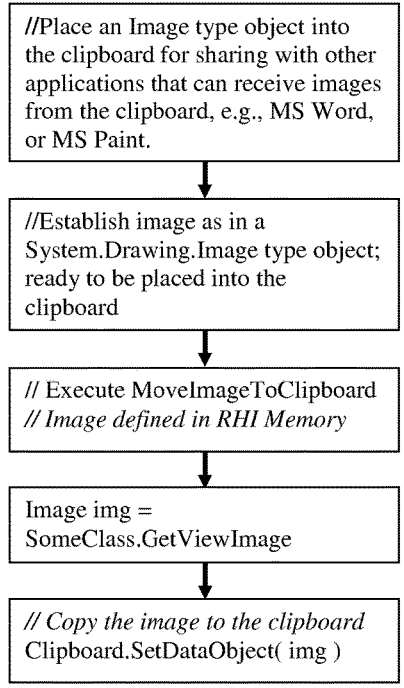

Figure 24

| Built-in Macro | Assigned Shortcut | Translation of Macro to VB Code |
|---|---|---|
| StartOfDocument | Cntrl+Home | Selection.HomeKey Unit:=wdStory |
| GoToNextPage | User choice | Selection.GoToNext wdGoToPage |
| GoToNextLine | Down | Selection.MoveDown Unit:=wdLine, Count:=1 |
| CharRight | Right | Selection.MoveRight Unit:=wdCharacter, Count:=1 |
| CharRightExtend | Shift+Right | Selection.MoveRight Unit:=wdCharacter, Count:=1, Extend:=wdExtend |
| EditClear | Del | Selection.Delete Unit:=wdCharacter, Count:=1 |
| EditCut | Cntrl+X or Shift+Del | Selection.Cut |
| EditPaste | Cntrl+V or Shift+Insert | Selection.Paste |

Figure 25

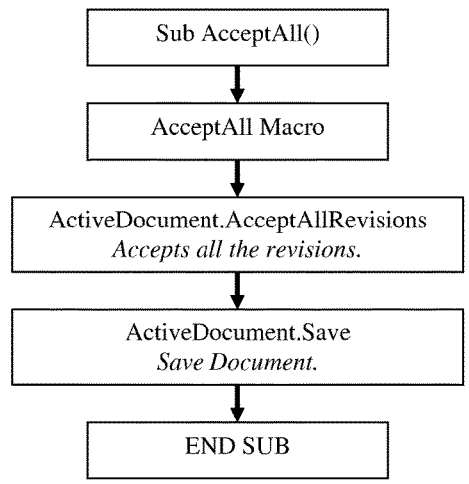

Figure 33

| Built-in Macro | Assigned Shortcut | Translation of Macro to VB Code |
|---|---|---|
| GotoCommentScope | User choice | Selection.Comments(1).Range.Select |
| GotoNextComment | User choice | Selection.GoToNext wdGoToComment |
| GotoPreviousComment | User choice | Selection.GoToPrevious wdGoToComment |
| InsertAnnotation | Alt+Cnrl+M | Selection.Comments.Add Range:=Selection.Range |
| DeleteAnnotation | Alt+Shift+C | ActiveWindow.ActivePane.Close |
| ViewAnnotation | User choice | ActiveWindow.View.SplitSpecial = wdPaneComments |

Figure 34

| Key | Macro translation to VB Code for MS Word |
|---|---|
| A | Selection.TypeText Text:="A" |
| a | Selection.TypeText Text:="a" |
| B | Selection.TypeText Text:="B" |
| C | Selection.TypeText Text:="C" |
| c | Selection.TypeText Text:="c" |
| D | Selection.TypeText Text:="D" |
| E | Selection.TypeText Text:="E" |
| F | Selection.TypeText Text:="F" |
| G | Selection.TypeText Text:="G" |
| H | Selection.TypeText Text:="H" |
| I | Selection.TypeText Text:="I" |
| J | Selection.TypeText Text:="J" |
| K | Selection.TypeText Text:="K" |
| L | Selection.TypeText Text:="L" |
| M | Selection.TypeText Text:="M" |
| 0 | Selection.TypeText Text:="0" |
| 1 | Selection.TypeText Text:="1" |
| 2 | Selection.TypeText Text:="2" |
| 3 | Selection.TypeText Text:="3" |
| 4 | Selection.TypeText Text:="4" |
| 5 | Selection.TypeText Text:="5" |
| 6 | Selection.TypeText Text:="6" |
| @ | Selection.TypeText Text:="@" |
|  |  |
| ↑ | Selection.MoveUp Unit:=wdLine, Count:=1 |
| ↓ | Selection.MoveDown Unit:=wdLine, Count:=1 |
| → | Selection.MoveRight Unit:=wdCharacter, Count:=1 |
| ← | Selection.MoveLeft Unit:=wdCharacter, Count:=1 |
| Page Up | Selection.MoveUp Unit:=wdScreen, Count:=1 |
| Page Down | Selection.MoveDown Unit:=wdScreen, Count:=1 |
| Home | Selection.HomeKey Unit:=wdLine |
| End | Selection.EndKey Unit:=wdLine |
|  |  |
| Tab | Selection.TypeText Text:=vbTab |
| Tab w/i a Table | Selection.MoveRight Unit:=wdCell |
| Esq | Selection.EscapeKey |
| Shift | Macro may only be recorded in combination with other keys |
| Caps Lock | Macro for this key may not be recorded |
|  |  |

Figure 35

INTEGRATED DOCUMENT EDITOR

CROSS-REFERENCE TO RELATED APPLICATIONS

This Application is a divisional of U.S. Non-Provisional application Ser. No. 13/092,114, filed Apr. 21, 2011, and issued as U.S. Pat. No. 8,458,239, which is a continuation of application Ser. No. 11/144,492, filed Jun. 2, 2005 and issued as U.S. Pat. No. 7,961,943, the contents of each of which are herein incorporated by reference.

BACKGROUND OF THE INVENTION

This invention relates to document creation and editing. More specifically, this invention relates to integration of recognition of information entry with document creation. Handwritten data entry into computer programs is known. The most widespread use has been in personal digital assistant devices. Handwritten input to devices using keyboards is not widespread for various reasons. For example, character transcription and recognition is relatively slow, and there are as yet no widely accepted standards for character or command input.

SUMMARY OF THE INVENTION

According to the invention, methods and systems are provided for incorporating handwritten information, particularly corrective information, into a previously created revisable text or graphics document, for example text data, image data or command cues, by use of a digitizing recognizer, such as a digitizing pad, a touch screen or other positional input receiving mechanism as part of a display. In a data entry mode, a unit of data is inserted by means of a writing pen or like scribing tool and accepted for placement at a designated location, correlating x-y location of the writing pen to the actual location in the document, or accessing locations in the document memory by emulating keyboard keystrokes (or by the running of code/programs). In a recognition mode, the entered data is recognized as legible text with optionally embedded edit or other commands, and it is converted to machine-readable format. Otherwise, the data is recognized as graphics (for applications that accommodate graphics) and accepted into an associated image frame. Combinations of data, in text or in graphics form, may be concurrently recognized. In a specific embodiment, there is a window of error in location of the writing tool after initial invocation of the data entry mode, so that actual placement of the tool is not critical, since the input of data is correlated by the initial x-y location of the writing pen to the actual location in the document. In addition, there is an allowed error as a function of the pen's location within the document (i.e., with respect to the surrounding data). In a command entry mode, handwritten symbols selected from a basic set common to various application programs may be entered and the corresponding commands may be executed. In specific embodiments, a basic set of handwritten symbols and/or commands that are not application-dependent and that are preferably user-intuitive are applied. This handwritten command set allows for the making of revisions and creating documents without having prior knowledge of commands for a specific application.

In a specific embodiment, such as in use with the Microsoft Word word processor, the invention may be implemented when the user invokes the Comments Mode of Word at a designated location in a Word-type document and then the handwritten information may be entered via the input device into the native Comments field, whereupon it is either converted to text or image or to the command data to be executed, with a handwriting recognizer operating either concurrently or after completion of entry of a unit of the handwritten information. Information recognized as text is then converted to ciphers and imported into the main body of the text, either automatically or upon a separate command. Information recognized as graphics is then converted to image data, such as a native graphics format or as a JPEG image and imported into to the main body of the text at the designated point, either automatically or upon a separate command. Information interpreted as commands can be executed, such as editing commands, which control addition, deletion or movement of text within the document, as well as font type or size change or color change. In a further specific embodiment, the invention may be incorporated as a plug-in module for the word processor program and invoked as part of the system, such as the use of a macro or as invoked through the Track Changes feature.

In an alternative embodiment, the user may manually indicate, prior to invoking the recognition mode, the nature of the input, whether the input is text, graphics or command, recognition can be further improved by providing a step-by-step protocol prompted by the program for setting up preferred symbols and for learning the handwriting patterns of the user.

These and other features of the invention will be better understood by reference to the following detailed description in connection with the accompanying drawings, which should be taken as illustrative and not limiting.

BRIEF DESCRIPTION OF THE DRAWINGS

FIG. 10 is an example of a memory block format of the RHI memory suitable for storing data associated with one handwritten command.

FIG. 24 is a sample of code for subroutine N referenced in FIG. 23 and FIG. 37, for copying an image from the RHI memory into the clipboard.

FIG. 25 is a sample of translated Visual Basic code for built-in macros referenced in the flow charts of FIG. 26 to FIG. 32 and FIG. 37.

FIG. 33 is a sample of code in Visual Basic for the subroutine M referenced in FIG. 4 and FIG. 5, for concluding embedding of the revisions for MS Word, according to the second embodiment using the running of programs.

FIG. 34 is a sample of translated Visual Basic code for useful built-in macros in comment mode for MS Word.

FIG. 35 provides examples of recorded macros translated into Visual Basic code that emulates some keyboard keys for MS Word.

DETAILED DESCRIPTION OF THE INVENTION

Figure 1:
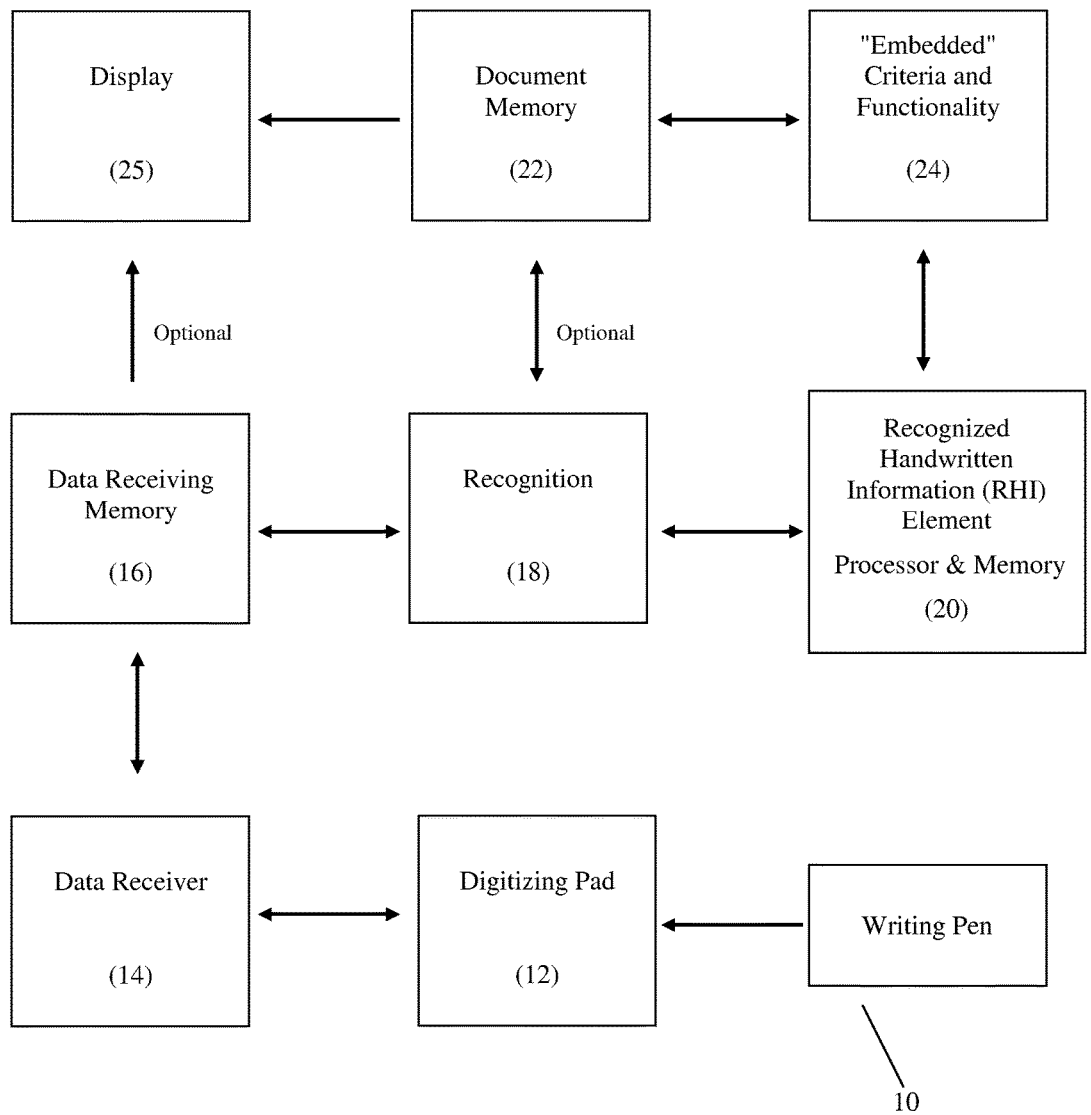
FIG. 1 is a block schematic diagram illustrating basic functional blocks and data flow according to one embodiment of the invention.

Referring to FIG. 1, there is a block schematic diagram of an integrated document editor 10 according to a first embodiment of the invention, which illustrates the basic functional blocks and data flow according to that first embodiment. A digitizing pad 12 is used, with its writing area (e.g., within margins of an 8½"×11" sheet) to accommodate standard sized papers that corresponds to the x-y location of the edited page. Pad 12 receives data from a writing pen 10 (e.g., magnetically, or mechanically by way of pressure with a standard pen). Data from the digitizing pad 12 is read by a data receiver 14 as bitmap and/or vector data and then stored corresponding to or referencing the appropriate x-y location in a data receiving memory 16. Optionally, this information can be displayed on the screen of a display 25 on a real-time basis to provide the writer with real-time feedback.

Figure 38:
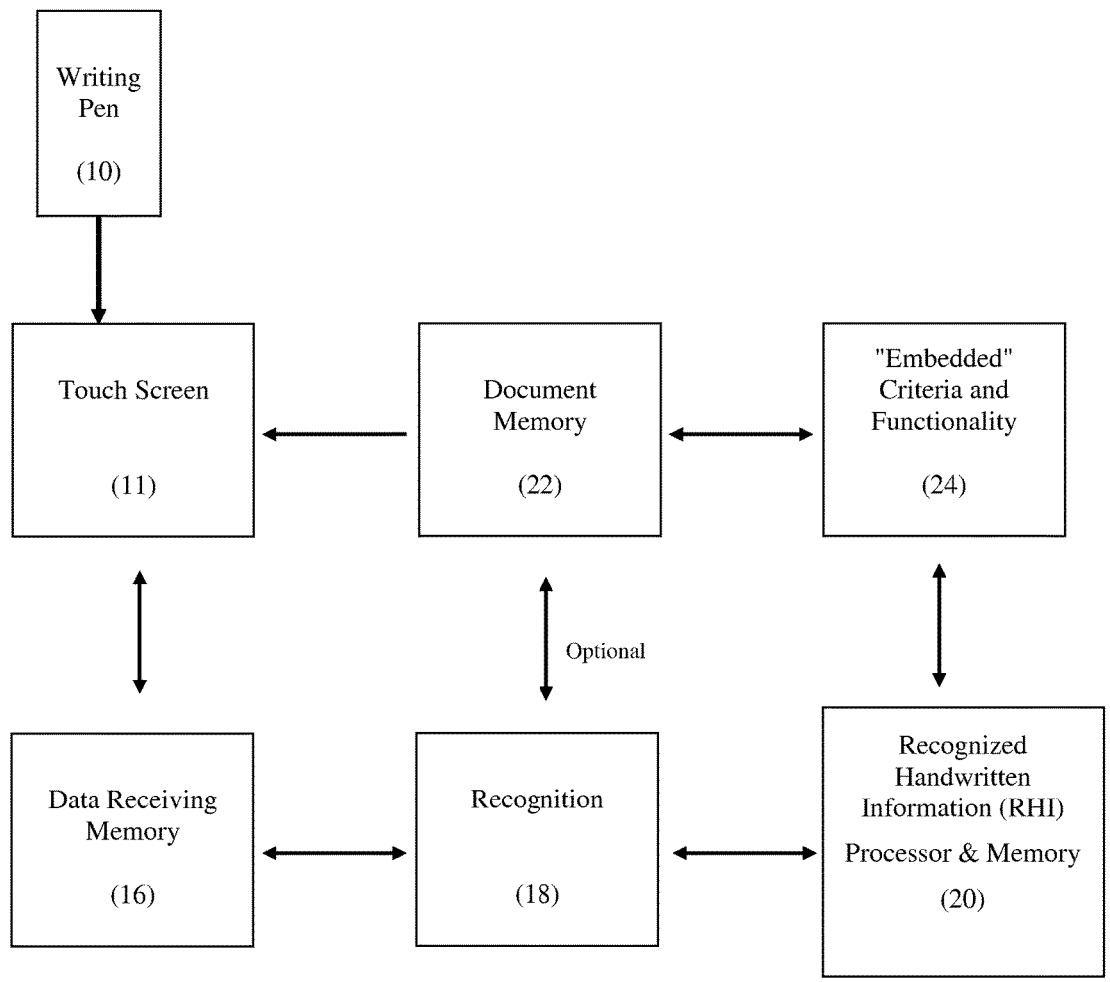
FIG. 38 is an alternate block schematic diagram to the one illustrated in FIG. 1, illustrating basic functional blocks and data flow according to another embodiment of the invention, using a touch screen.

Alternatively, and as illustrated in FIG. 38, a touch screen 11 (or other positional input receiving mechanism as part of a display) with its receiving and displaying mechanisms integrated, receives data from the writing pen 10, whereby the original document is displayed on the touch screen as it would have been displayed on a printed page placed on the digitizing pad 12 and the writing by the pen 10 occurs on the touch screen at the same locations as it would have been written on a printed page). Under this scenario, the display 25, pad 12 and data receiver 14 of FIG. 1 are replaced with element 11, the touch screen and associated electronics of FIG. 38, and elements 16, 18, 20, 22, and 24 are discussed hereunder with reference to FIG. 1. Under the touch screen display alternative, writing paper is eliminated.

When a printed page is used with the digitizing pad 12, adjustments in registration of location may be required such that locations on the printed page correlates to the correct x-y locations for data stored in the data receiving memory 16.

The correlation between locations of the writing pen 10 (on the touch screen 11 or on the digitizing pad 12) and the actual x-y locations in the document memory 22 need not be perfectly accurate, since the location of the pen 10 is with reference to existing machine code data. In other words, there is a window of error around the writing point that can be allowed without loss of useful information, because it is assumed that the new handwritten information (e.g., revisions) must always correspond to a specific location of the pen, e.g., near text, drawing or image. This is similar to, but not always the same as, placing a cursor at an insertion point in a document and changing from command mode to data input mode. For example, the writing point may be between two lines of text but closer to one line of text than to the other. This window of error could be continuously computed as a function of the pen tapping point and the data surrounding the tapping point. In case of ambiguity as to the exact location where the new data are intended to be inserted (e.g., when the writing point overlaps multiple possible locations in the document memory 22), the touch screen 11 (or the pad 12) may generate a signal, such as a beeping sound, requesting the user to tap closer to the point where handwritten information needs to be inserted. If the ambiguity is still not resolved (when the digitizing pad 12 is used), the user may be requested to follow an adjustment procedure.

If desired, adjustments may be made such that the writing area on the digitizing pad 12 will be set to correspond to a specific active window (for example, in multi-windows screen), or to a portion of a window (i.e., when the active portion of a window covers partial screen, e.g., an invoice or a bill of an accounting program QuickBooks), such that the writing area of the digitizing pad 12 is efficiently utilized. In situations where a document is a form (e.g., an order form), the paper document can be a pre-set to the specific format of the form, such that the handwritten information can be entered at specific fields of the form (that correspond to these fields in the document memory 22). In addition, in operations that do not require archiving of the handwritten paper documents, handwritten information on the digitizing pad 12 may be deleted after it is integrated into the document memory 22. Alternatively, multi-use media that allow multiple deletions (that clear the handwritten information) can be used, although the touch screen alternative would be preferred over this alternative.

A recognition functionality element 18 reads information from the data receiving memory 16 and writes the recognition results or recognized handwritten elements into the recognized handwritten information (RHI) memory 20. Recognized handwritten information elements, (RHI elements) such as characters, words, and symbols, are stored in the RHI memory 20. Location of an RHI element in the RHI memory 20 correlates to its location in the data receiving memory 14 and in the document memory 22. Preferably, after symbols are recognized and interpreted as commands, they may be stored as images or icons in (for example) JPEG format (or they can be emulated as if they were keyboard keys. This technique will be discussed hereafter), since the symbols are intended to be intuitive. They can be useful for reviewing and interpreting revisions in the document. In addition, the recognized handwritten information prior to final incorporation (e.g., revisions for review) may be displayed either in handwriting (as is or as revised machine code handwriting for improved readability) or in standard text.

An embedded criteria and functionality element 24 reads the information from the RHI memory 20 and embeds it into the document memory 22. Information in the document memory 22 is displayed on the display 25, which is for example a computer monitor or a display of a touch screen. The embedded functionality determines what to display and what to be embedded into the document memory 22 based on the stage of the revision and selected user criteria/preferences.

Embedding the recognized information into the document memory 22 can be either applied concurrently or after input of all handwritten information, such as after revisions, have been concluded. Incorporation of the handwritten information concurrently can occur with or without user involvement. The user can indicate each time a handwritten command and its associated text and/or image has been concluded, and then it can be incorporated into the document memory 22 one at a time. (Incorporation of handwritten information concurrently without user involvement will be discussed hereafter.) The document memory 22 contains, for example, one of the following files: 1) A word processing file, such as a MS Word file or a Word Perfect file, 2) A spreadsheet, such as an Excel file, 3) A form such as a sales order, an invoice or a bill in accounting software (e.g., QuickBooks), 4) A table or a database, 5) A desktop publishing file, such as a QuarkXpress or a PageMaker file, or 6) A presentation file, such as a MS Power Point file.

It should be noted that the document could be any kind of electronic file, word processing document, spreadsheet, web page, form, e-mail, database, table, template, chart, graph, image, object, or any portion of these types of documents, such as a block of text or a unit of data. In addition, the document memory 22, the data receiving memory 16 and the RHI memory 20 could be any kind of memory or memory device or a portion of a memory device, e.g., any type of RAM, magnetic disk, CD-ROM, DVD-ROM, optical disk or any other type of storage. It should be further noted that a skilled in the art will recognize that the elements/components discussed herein (e.g., in FIGS. 1, 38, 9, 11, 13), such as the RHI element may be implemented in any combination of electronic or computer hardware and/or software. For example, the invention could be implemented in software operating on a general-purpose computer or other types of computing/communication devices, such as hand-held computers, personal digital assistant (PDA)s, cell phones, etc. Alternatively, a general-purpose computer may be interfaced with specialized hardware such as an Application Specific Integrated Circuit (ASIC) or some other electronic components to implement the invention. Therefore, it is understood that the invention may be carried out using various codes of one or more software modules forming a program and executed as instructions/data by, e.g., a central processing unit, or using hardware modules specifically configured and dedicated to perform the invention. Alternatively, the invention may be carried out using a combination of software and hardware modules.

The recognition functionality element 18 encompasses one or more of the following recognition approaches:

1—Character recognition, which can for example be used in cases where the user clearly spells each character in capital letters in an effort to minimize recognition errors, 2—A holistic approach where recognition is globally performed on the whole representation of the words and there is no attempt to identify characters individually. (The main advantage of the holistic methods is that they avoid word segmentation. Their main drawback is that they are related to a fixed lexicon of words description: since these methods do not rely on letters, words are directly described by means of features. Adding new words to the lexicon typically requires human training or the automatic generation of a word description from ASCII words.)

3—Analytical strategies that deal with several levels of representation corresponding to increasing levels of abstractions. (Words are not considered as a whole, but as sequences of smaller size units, which must be easily related to characters in order to make recognition independent from a specific vocabulary.)

Strings of words or symbols, such as those described in connection with FIG. 7 and discussed hereafter, can be recognized by either the holistic approach or by the analytical strategies, although character recognition may be preferred. Units recognized as characters, words or symbols are stored into the RHI memory 20, for example in ASCII format. Units that are graphics are stored into the RHI memory as graphics, for example as a JPEG file. Units that could not be recognized as a character, word or a symbol are interpreted as images if the application accommodates graphics and optionally, if approved by the user as graphics and stored into the RHI memory 20 as graphics. It should be noted that units that could not be recognized as character, word or symbol may not be interpreted as graphics in applications that do not accommodate graphics (e.g., Excel); in this scenario, user involvement may be required.

To improve the recognition functionality, data may be read from the document memory 22 by the recognition element 18 to verify that the recognized handwritten information does not conflict with data in the original document and to resolve/minimize as much as possible recognized information retaining ambiguity. The user may also resolve ambiguity by approving/disapproving recognized handwritten information (e.g., revisions) shown on the display 25. In addition, adaptive algorithms (beyond the scope of this disclosure) may be employed. There under user involvement may be relatively significant at first, but as the adaptive algorithms learn the specific handwritten patterns and store them as historical patterns, future ambiguities should be minimized as recognition become more robust.

Figure 2:
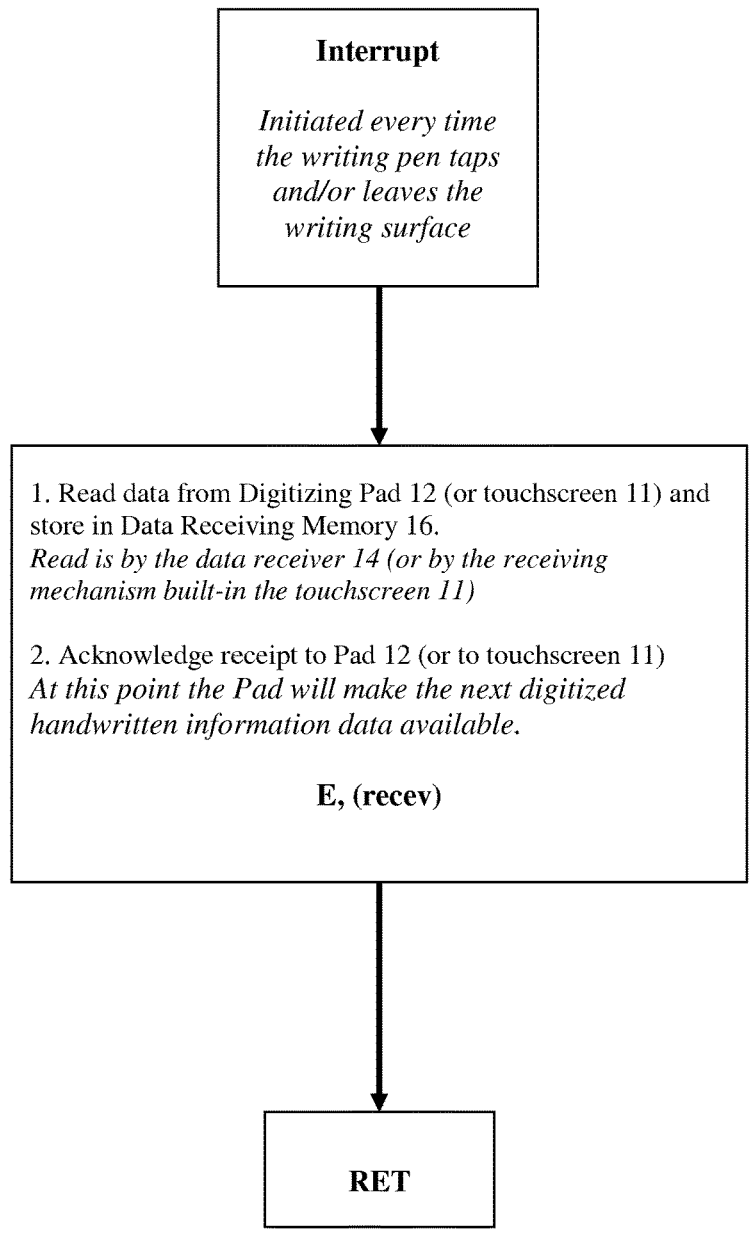
FIG. 2 is a flow chart of an interrupt handler that reads handwritten information in response to writing pen taps on a writing surface.
Figure 5:
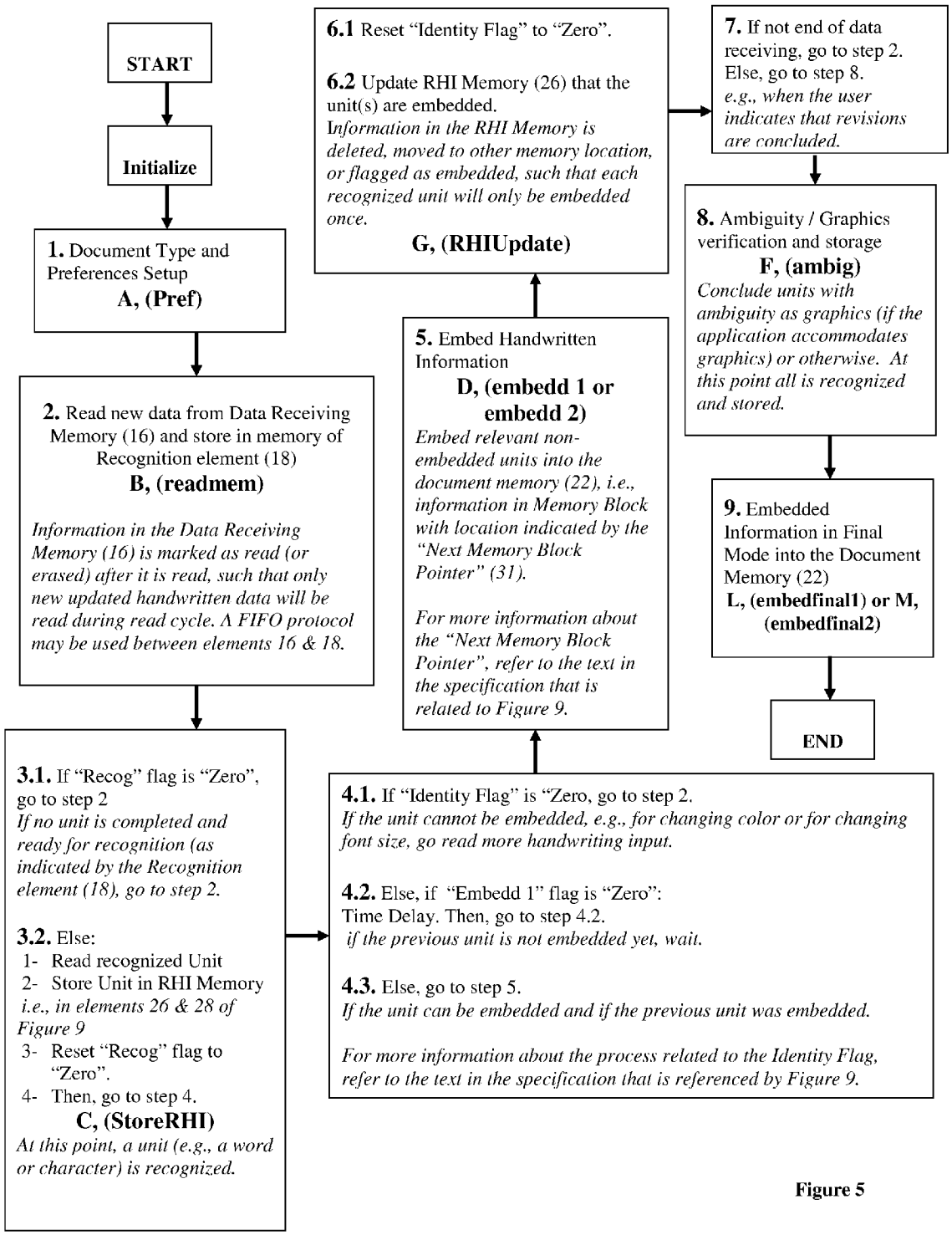
FIG. 5 is a flow chart of operation according to a representative embodiment of the invention, wherein handwritten information is incorporated into the document concurrently during input.

FIG. 2 though FIG. 5 are flow charts of operation according to an exemplary embodiment and are briefly explained herein below. The text in all of the drawings is herewith explicitly incorporated into this written description for the purposes of claim support. FIG. 2 illustrates a program that reads the output of the digitizing pad 12 (or of the touch screen 11) each time the writing pen 10 taps on and/or leaves the writing surface of the pad 12 (or of the touch screen 11). Thereafter data is stored in the data receiving memory 16 (Step E). Both the recognition element and the data receiver (or the touch screen) access the data receiving memory. Therefore, during read/write cycle by one element, the access by the other element should be disabled.

Figure 3:
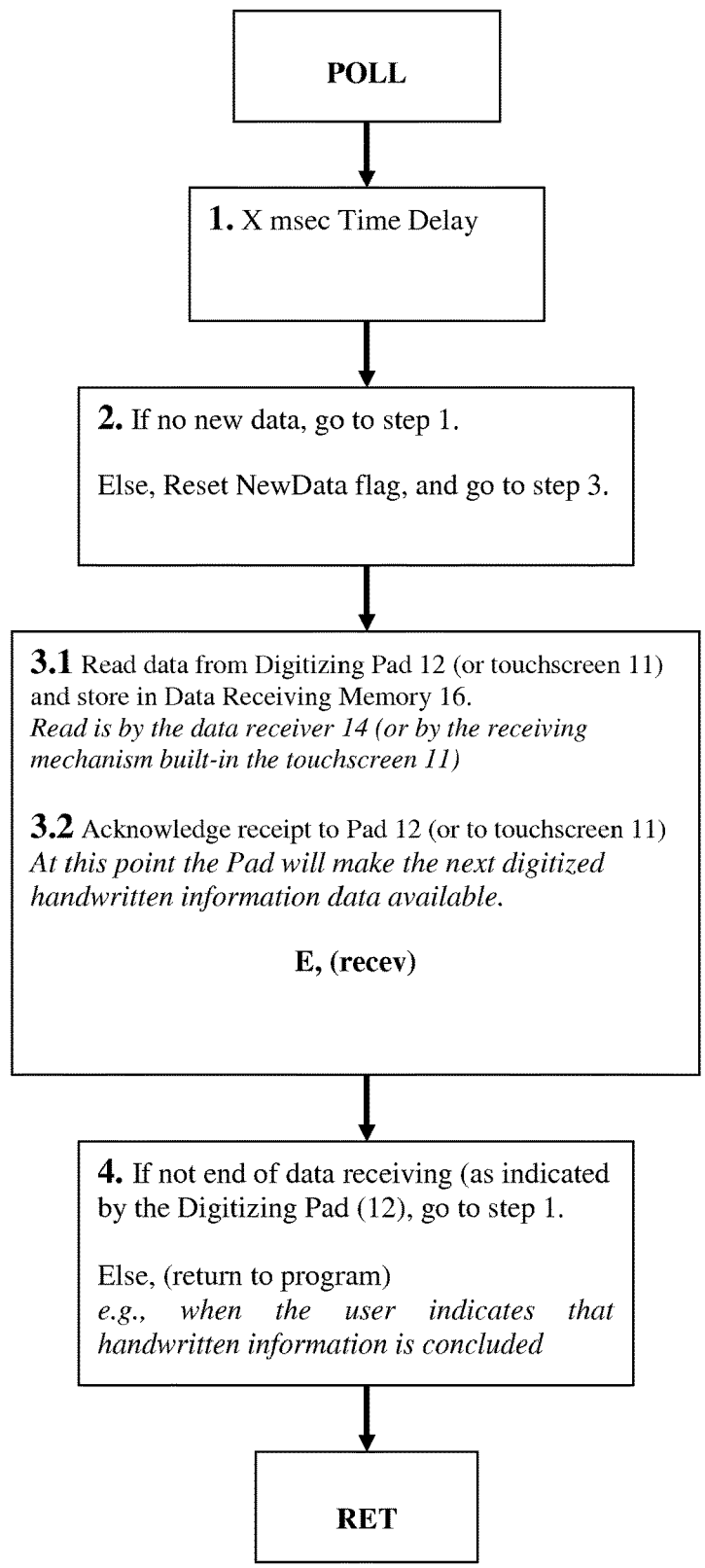
FIG. 3 is a flow chart of a polling technique for reading handwritten information.

Optionally, as illustrated in FIG. 3, the program checks every few milliseconds to see if there is a new data to read from the digitizing pad 12 (or of the touch screen 11). If so, data is received from the digitizing recognizer and stored in the data receiving memory 16 (E). This process continues until the user indicates that the revisions are concluded, or until there is a timeout.

Figure 4:
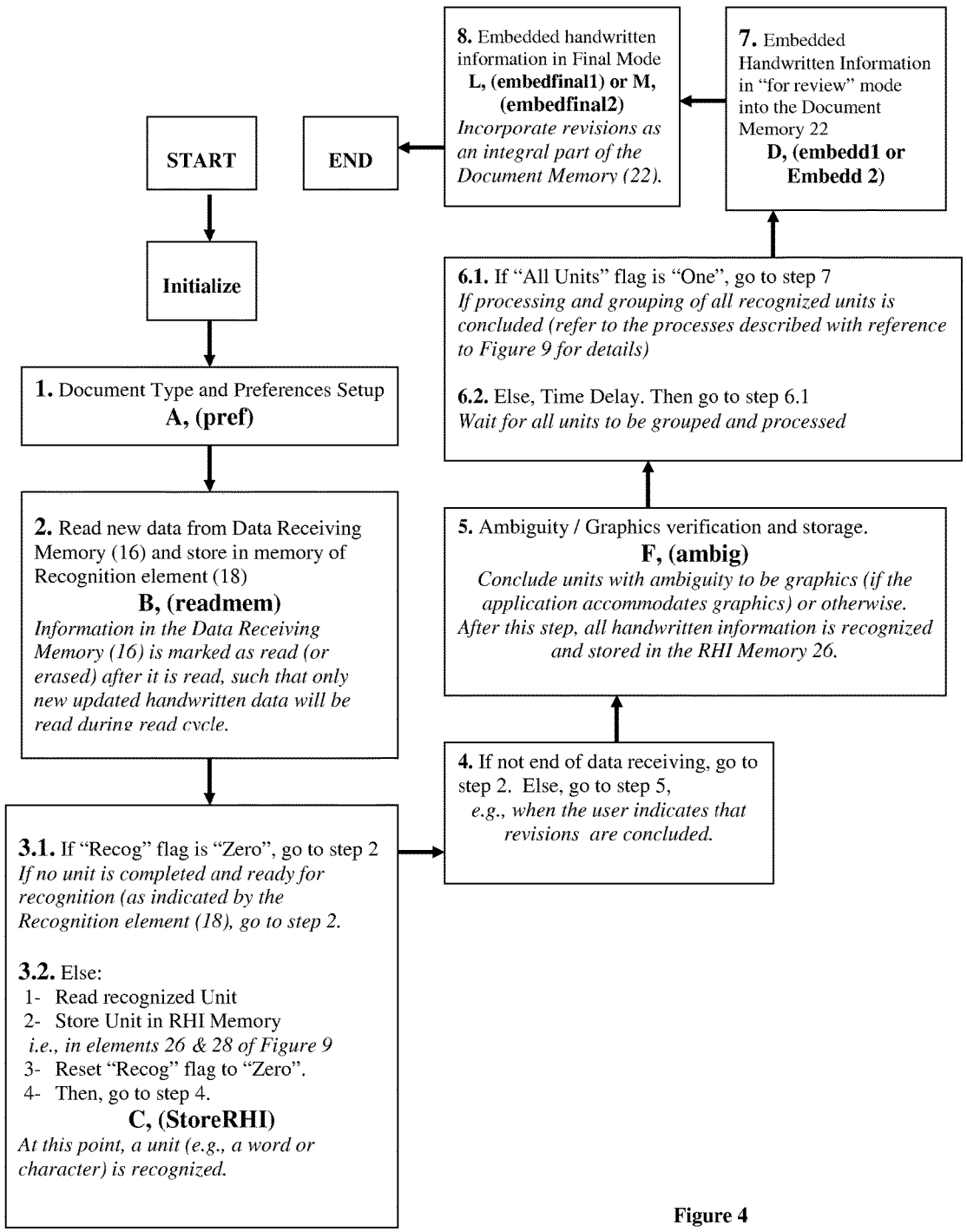
FIG. 4 is a flow chart of operation according to a representative embodiment of the invention wherein handwritten information is incorporated into the document after all handwritten information is concluded.

Embedding of the handwritten information may be executed either all at once according to procedures explained with FIG. 4, or concurrently according to procedures explained with FIG. 5.

The recognition element 18 recognizes one unit at a time, e.g., a character, a word, graphic or a symbol, and makes them available to the RHI processor and memory 20 (C). The functionality of this processor and the way in which it stores recognized units into the RHI memory will be discussed hereafter with reference to FIG. 9. Units that are not recognized immediately are either dealt with at the end as graphics, or the user may indicate otherwise manually by other means, such as a selection table or keyboard input (F). Alternatively, graphics are interpreted as graphics if the user indicates when the writing of graphics begins and when it is concluded. Once the handwritten information is concluded, it is grouped into memory blocks, whereby each memory block contains all (as in FIG. 4) or possibly partial (as in FIG. 5) recognized information that is related to one handwritten command, e.g., a revision. The embedded function (D) then embeds the recognized handwritten information (e.g., revisions) in "for review" mode. Once the user approves/disapproves revisions, they are embedded in final mode (L) according to the preferences set up (A) by the user. In the examples illustrated hereafter, revisions in MS Word are embedded in Track Changes mode all at once. Also in the examples illustrated hereafter, revisions in MS Word that are according to FIG. 4 may for example be useful when the digitizing pad 12 is separate from the rest of the system, whereby handwritten information from the digitizing pad internal memory may be downloaded into the data receiving memory 16 after the revisions are concluded via a USB or other IEEE or ANSI standard port.

FIG. 4 is a flow chart of the various steps, whereby embedding "all" recognized handwritten information (such as revisions) into the document memory 22 is executed once "all" handwritten information is concluded. First, the Document Type is set up (e.g., Microsoft Word or QuarkXpress), with software version and user preferences (e.g., whether to incorporate revisions as they are available or one at a time upon user approval/disapproval), and the various symbols preferred by the user for the various commands such as for inserting text, for deleting text and for moving text around) (A). The handwritten information is read from the data receiving memory 16 and stored in the memory of the recognition element 18 (B). Information that is read from the receiving memory 16 is marked/flagged as read, or it is erased after it is read by the recognition element 18 and stored in its memory; this will insure that only new data is read by the recognition element 18.

FIG. 5 is a flow chart of the various steps whereby embedding recognized handwritten information (e.g., revisions) into the document memory 22 is executed concurrently (e.g., with the making of the revisions). Steps 1-3 are identical to the steps of the flow chart in FIG. 4 (discussed above). Once a unit, such as a character, a symbol or a word is recognized, it is processed by the RHI processor 20 and stored in the RHI memory. A processor (GMB functionality 30 referenced in FIG. 9) identifies it as either a unit that can be embedded immediately or not. It is checked if it can be embedded (step 4.3); if it can be (step 5), it is embedded (D) and then (step 6) deleted or marked/updated as an embedded (G). If it cannot be embedded (step 4.1), more information is read from the digitizing pad 12 (or from the touch screen 11). This process of steps 4-6 repeats and continues so long as handwritten information is forthcoming. Once all data is embedded (indicated by an End command or a simple timeout), units that could not be recognized are dealt with (F) in the same manner discussed for the flow chart of FIG. 4. Finally, once the user approves/disapproves revisions, they are embedded in final mode (L) according to the preferences chosen by the user.

Figure 6:
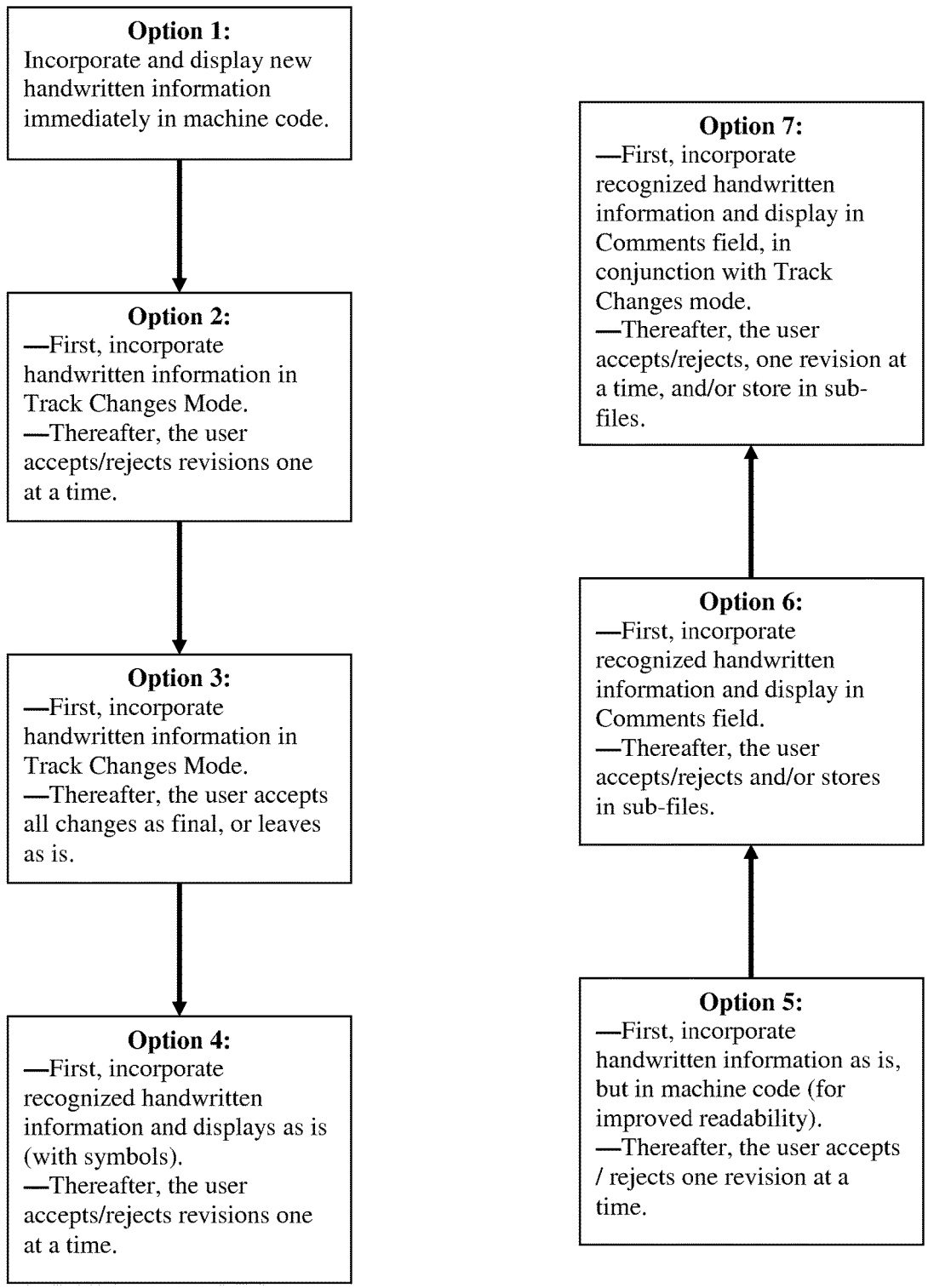
FIG. 6 is an illustration example of options available for displaying handwritten information during various steps in the process according to the invention.

FIG. 6 is an example of the various options and preferences available to the user to display the handwritten information in the various steps for MS Word. In "For Review" mode the revisions are displayed as "For Review" pending approval for "Final" incorporation. Revisions, for example, can be embedded in a "Track Changes" mode, and once approved/disapproved (as in "Accept/Reject changes"), they are embedded into the document memory 22 as "Final". Alternatively, symbols may be also displayed on the display 25. The symbols are selectively chosen to be intuitive, and, therefore, can be useful for quick review of revisions. For the same reason, text revisions may be displayed either in handwriting as is, or as revised machine code handwriting for improved readability; in "Final" mode, all the symbols are erased, and the revisions are incorporated as an integral part of the document.

Figure 7:
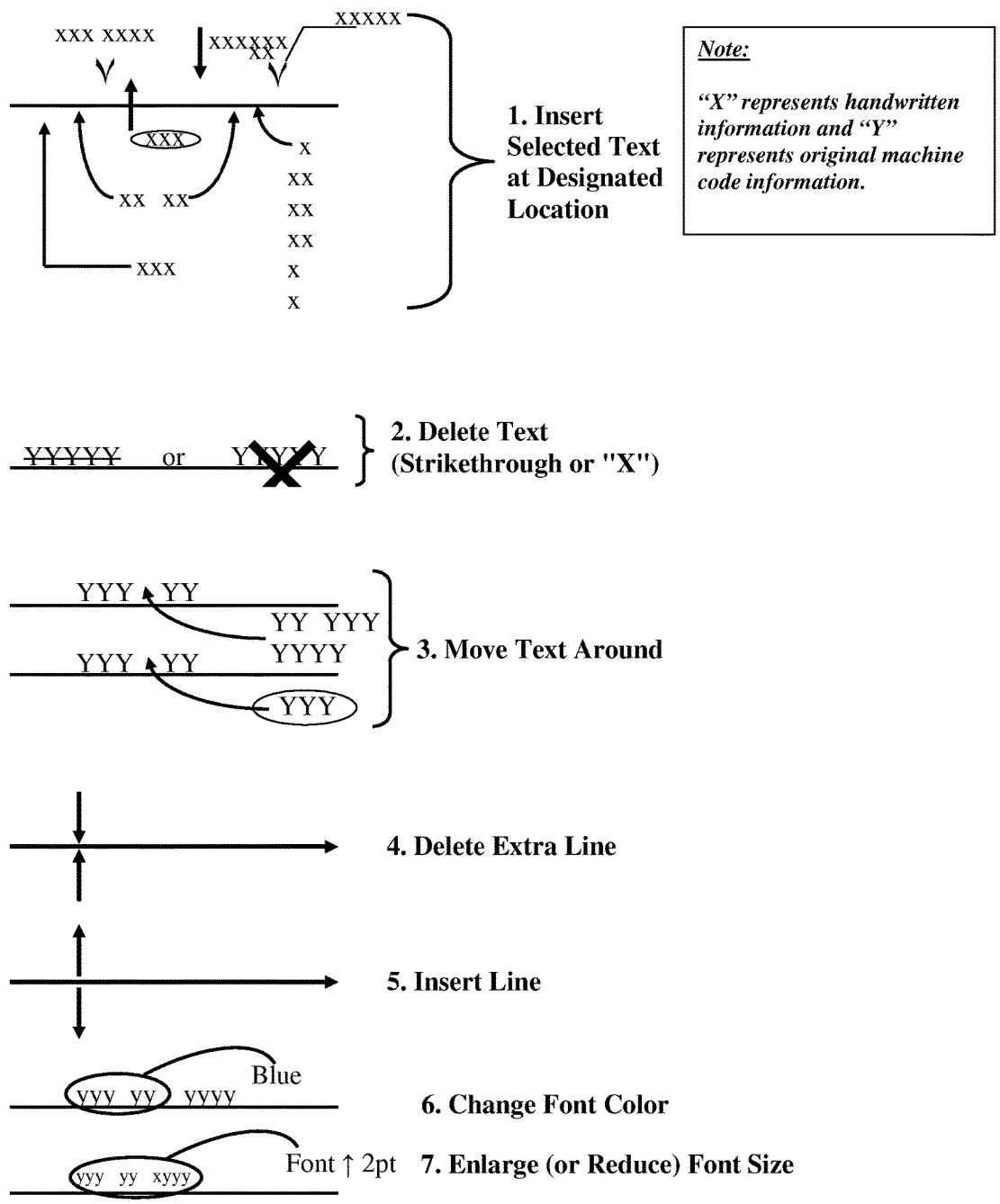
FIG. 7 is an illustration of samples of handwritten symbols/commands and their associated meanings.

An example of a basic set of handwritten commands/symbols and their interpretation with respect to their associated data for making revisions in various types of documents is illustrated in FIG. 7.

Direct access to specific locations is needed in the document memory 22 for read/write operations. Embedding recognized handwritten information from the RHI memory 20 into the document memory 22 (e.g., for incorporating revisions) may not be possible (or limited) for after-market applications. Each of the embodiments discussed below provides an alternate "back door" solution to overcome this obstacle.

Embodiment One: Emulating Keyboard Entries

Command information in the RHI memory 20 is used to insert or revise data, such as text or images in designated locations in the document memory 22, wherein the execution mechanisms emulate keyboard keystrokes, and when available, operate in conjunction with running pre-recorded and/or built-in macros assigned to sequences of keystrokes (i.e., shortcut keys). Data such as text can be copied from the RHI memory 20 to the clipboard and then pasted into designated location in the document memory 22, or it can be emulated as a keyboard keystrokes. This embodiment will be discussed hereafter.

Embodiment Two, Running Programs

In applications such as Microsoft Word, Excel and WordPerfect, where programming capabilities, such as VB Scripts and Visual Basic are available, the commands and their associated data stored in the RHI memory 20 are translated to programs that embed them into the document memory 22 as intended. In this embodiment, the operating system clipboard can be used as a buffer for data (e.g., text and images). This embodiment will also be discussed hereafter.

Information associated with a handwritten command as discussed in Embodiment One and Embodiment Two is either text or graphics (image), although it could be a combination of text and graphics. In either embodiment, the clipboard can be used as a buffer.

For Copy Operations in the RHI Memory.

When a unit of text or image is copied from a specific location indicated in the memory block in the RHI memory 20 to be inserted in a designated location in the document memory 22.

For Cut/Paste and for Paste Operations within the Document Memory.

For moving text or image around within the document memory 22, and for pasting text or image copied from the RHI memory 20.

A key benefit of Embodiment One is usefulness in a large array of applications, with or without programming capabilities, to execute commands, relying merely on control keys, and when available built-in or pre-recorded macros. When a control key, such as Arrow Up or a simultaneous combination of keys, such as Cntrl-C, is emulated, a command is executed.

Macros cannot be run in Embodiment Two unless translated to actual low-level programming code (e.g., Visual Basic Code). In contrast, running a macro in a control language native to the application (recorded and/or built-in) in Embodiment One is simply achieved by emulating its assigned shortcut key(s). Embodiment Two may be preferred over Embodiment One, for example in MS Word, if a Visual Basic Editor is used to create codes that include Visual Basic instructions that cannot be recorded as macros.

Alternatively, Embodiment Two may be used in conjunction with Embodiment One, whereby, for example, instead of moving text from the RHI memory 20 to the clipboard and then placing it in a designation location in the document memory 22, text is emulated as keyboard keystrokes. If desired, the keyboards keys can be emulated in Embodiment Two by writing a code for each key, that, when executed, emulates a keystroke. Alternatively, Embodiment One may be implemented for applications with no programming capabilities, such as QuarkXpress, and Embodiment Two may be implemented for some of the applications that do have programming capabilities. Under this scenario, some applications with programming capabilities may still be implemented in Embodiment One or in both Embodiment One and Embodiment Two.

Alternatively, x-y locations in the data receiving memory 16 (as well as designated locations in the document memory 22), can be identified on a printout or on the display 25 (and if desired, on the touch screen 11) based on: 1) recognition/identification of a unique text and/or image representation around the writing pen, and 2) searching for and matching the recognized/identified data around the pen with data in the original document (preferably, converted into the bitmap and/or vector format that is identical to the format handwritten information is stored in the data receiving memory 16). Then handwritten information along with its x-y locations correspondingly indexed in the document memory 22 is transmitted to a remote platform for recognition, embedding and displaying.

The data representation around the writing pen and the handwritten information are read by a miniature camera with attached circuitry that is built-in the pen. The data representing the original data in the document memory 22 is downloaded into the pen internal memory prior the commencement of handwriting, either via a wireless connection (e.g., Bluetooth) or via physical connection (e.g., USB port).

The handwritten information along with its identified x-y locations is either downloaded into the data receiving memory 16 of the remote platform after the handwritten information is concluded (via physical or wireless link), or it can be transmitted to the remote platform via wireless link as the x-y location of the handwritten information is identified. Then, the handwritten information is embedded into the document memory 22 all at once (i.e., according to the flow chart illustrated in FIG. 4), or concurrently (i.e., according to the flow chart illustrated in FIG. 5).

If desired, the display 25 may include pre-set patterns (e.g., engraved or silk-screened) throughout the display or at selected location of the display, such that when read by the camera of the pen, the exact x-y location on the display 25 can be determined. The pre-set patterns on the display 25 can be useful to resolve ambiguities, for example when the identical information around locations in the document memory 22 exists multiple times within the document.

Further, the tapping of the pen in selected locations of the touch screen 11 can be used to determine the x-y location in the document memory (e.g., when the user makes yes-no type selections within a form displayed on the touch screen). This, for example, can be performed on a tablet that can accept input from a pen or any other pointing device that function as a mouse and writing instrument.

Alternatively (or in addition to a touch screen), the writing pen can emit a focused laser/IR beam to a screen with thermal or optical sensing, and the location of the sensed beam may be used to identify the x-y location on the screen. Under this scenario, the use of a pen with a built-in miniature camera is not needed. When a touch screen or a display with thermal/optical sensing (or when preset patterns on an ordinary display) is used to detect x-y locations on the screen, the designated x-y location in the document memory 22 can be determined based on: 1) the detected x-y location of the pen 10 on the screen, and 2) parameters that correlate between the displayed data and the data in the document memory 22 (e.g., application name, cursor location on the screen and zoom percent).

Alternatively, the mouse could be emulated to place the insertion point at designated locations in the document memory 22 based on the X-Y locations indicated in the Data receiving memory 16. Then information from the RHI memory 20 can be embedded into the document memory 22 according to Embodiment One or Embodiment Two. Further, once the insertion point is at a designated location in the document memory 22, selection of text or an image within the document memory 22 may be also achieved by emulating the mouse pointer click operation.

Use of the Comments Insertion Feature:

The Comments feature of Microsoft Word (or similar comment-inserting feature in other program applications) may be employed by the user or automatically in conjunction with either of the approaches discussed above, and then handwritten information from the RHI memory 20 can be embedded into designated Comments fields of the document memory 22. This approach will be discussed further hereafter.

Use of the Track Changes Feature:

Before embedding information into the document memory 22, the document type is identified and user preferences are set (A). The user may select to display revisions in Track Change feature. The Track Changes Mode of Microsoft Word (or similar features in other applications) can be invoked by the user or automatically in conjunction with either or both Embodiment One and Embodiment Two, and then handwritten information from the RHI memory 20 can be embedded into the document memory 22. After all revisions are incorporated into the document memory 22, they can be accepted for the entire document, or they can be accepted/rejected one at a time upon user command. Alternatively, they can be accepted/rejected at the making of the revisions.

The insertion mechanism may also be a plug-in that emulates the Track Changes feature. Alternatively, the Track Changes Feature may be invoked after the Comments Feature is invoked such that revisions in the Comments fields are displayed as revisions, i.e., "For Review". This could in particular be useful for large documents reviewed/revised by multiple parties.

In another embodiment, the original document is read and converted into a document with known accessible format (e.g., ASCII for text and JPEG for graphics) and stored into an intermediate memory location. All read/write operations are performed directly on it. Once revisions are completed, or before transmitting to another platform, it can be converted back into the original format and stored into the document memory 22.

As discussed, revisions are written on a paper document placed on the digitizing pad 12, whereby the paper document contains/resembles the machine code information stored in the document memory 22, and the x-y locations on the paper document corresponds to the x-y locations in the document memory 22. In an alternative embodiment, the revisions can be made on a blank paper (or on another document), whereby, the handwritten information, for example, is a command (or a set of commands) to write or revise a value/number in a cell of a spreadsheet, or to update new information in a specific location of a database; this can be useful, for example in cases were an action to update a spreadsheet, a table or a database is needed after reviewing a document (or a set of documents). In this embodiment, the x-y location in the Receiving Memory 16 is immaterial.

RHI Processor and Memory Blocks

Before discussing the way in which information is embedded into the document memory 22 in greater detail with reference to the flow charts, it is necessary to define how recognized data is stored in memory and how it correlates to locations in the document memory 22. As previously explained, embedding the recognized information into the document memory 22 can be either applied concurrently or after all handwritten information has been concluded. The Embed function (D) referenced in FIG. 4 reads data from memory blocks in the RHI memory 20 one at a time, which corresponds to one handwritten command and its associated text data or image data. The Embed function (D) referenced in FIG. 5 reads data from memory blocks and embeds recognized units concurrently.

Memory blocks:

An example of how a handwritten command and its associated text or image is defined in the memory block 32 is illustrated in FIG. 10. This format may be expanded, for example, if additional commands are added, i.e., in addition to the commands specified in the Command field. The parameters defining the x-y location of recognized units (i.e., InsertionPoint1 and InsertionPoint2 in FIG. 10) vary as a function of the application. For example, the x-y locations/insertion points of text or image in MS Word can be defined with the parameters Page#, Line# and Column# (as illustrated in FIG. 10). In the application Excel, the x-y locations can be translated into the cell location in the spreadsheet, i.e., Sheet#, Row# and Column#. Therefore, different formats for x-y InsertionPoint1 and x-y InsertionPoint2 need to be defined to accommodate variety of applications.

Figure 9:
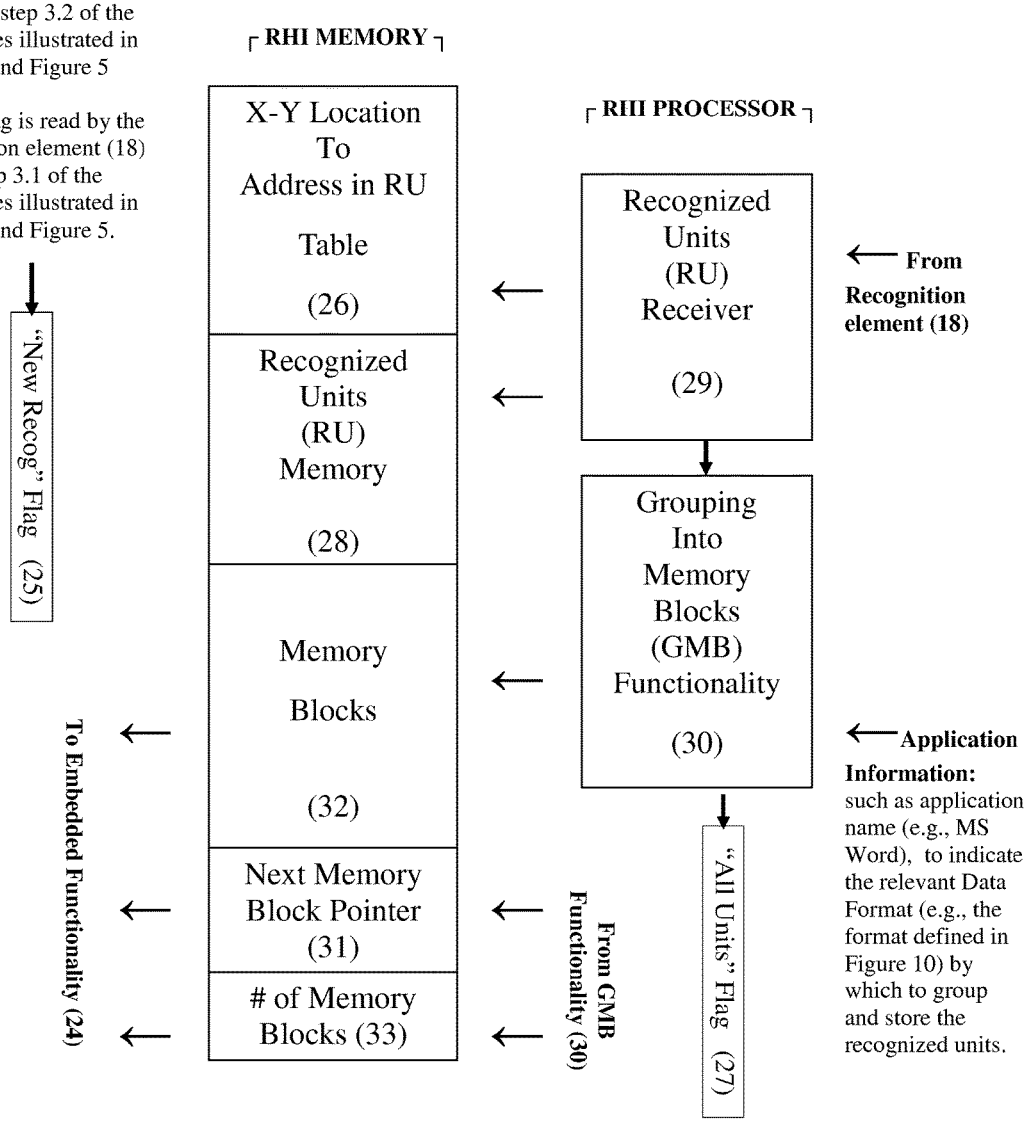
FIG. 9 is an illustration of data flow for data received from a recognition functionality element processed and defined in an RHI memory.

FIG. 9 is a chart of data flow of recognized units. These are discussed below.

FIFO (First in First Out) Protocol:

Once a unit is recognized it is stored in a queue, awaiting processing by the processor of element 20, and more specifically, by the GMB functionality 30. The "New Recog" flag (set to "One" by the recognition element 18 when a unit is available), indicates to the RU receiver 29 that a recognized unit (i.e., the next in the queue) is available. The "New Recog" flag is reset back to "Zero" after the recognized unit is read and stored in the memory elements 26 and 28 of FIG. 9 (e.g., as in step 3.2. of the subroutines illustrated in FIG. 4 and FIG. 5). In response, the recognition element 18: 1) makes the next recognized unit available to read by the RU receiver 29, and 2) sets the "New Recog" flag back to "One" to indicate to the RU receiver 29 that the next unit is ready. This process continues so long as recognized units are forthcoming. This protocol insures that the recognition element 18 is in synch with the speed with which recognized units are read from the recognition element and stored in the RHI memory (i.e., in memory elements 26 and 28 of FIG. 9). For example, when handwritten information is processed concurrently, there may be more than one memory block available before the previous memory block is embedded into the document memory 22.

In a similar manner, this FIFO technique may also be employed between elements 24 and 22 and between elements 16 and 18 of FIG. 1 and FIG. 38, and between elements 14 and 12 of FIG. 1, to insure that independent processes are well synchronized, regardless of the speed by which data is available by one element and the speed by which data is read and processed by the other element.

Optionally, the "New Recog" flag could be implemented in h/w (such as within an IC), for example, by setting a line to "High" when a recognized unit is available and to "Low" after the unit is read and stored, i.e., to acknowledge receipt.

Process 1:

As a unit, such as a character, a symbol or a word is recognized: 1) it is stored in Recognized Units (RU) Memory 28, and 2) its location in the RU memory 28 along with its x-y location, as indicated in the data receiving memory 16, is stored in the XY-RU Location to Address in RU table 26. This process continues so long as handwritten units are recognized and forthcoming.

Process 2:

In parallel to Process 1, the grouping into memory blocks (GMB) functionality 30 identifies each recognized unit such as a character, a word or a handwritten command (symbols or words), and stores them in the appropriate locations of memory blocks 32. In operations such as "moving text around", "increasing fonts size" or "changing color", an entire handwritten command must be concluded before it can be embedded into the document memory 22. In operations such as "deleting text" or "inserting new text", deleting or embedding the text can begin as soon as the command has been identified and the deletion (or insertion of text) operation can then continue concurrently as the user continue to write on the digitizing pad 12 (or on the touch screen 11).

In this last scenario, as soon as the recognized unit(s) is incorporated into (or deleted from) the document memory 22, it is deleted from the RHI memory 22, i.e., from the memory elements 26, 28 and 32 of FIG. 9. If deletion is not desired, embedded units may be flagged as "incorporated/embedded" or moved to another memory location (as illustrated in step 6.2 of the flow chart in FIG. 5). This should insure that information in the memory blocks is continuously current with new unincorporated information.

Process 3:

As unit(s) are grouped into memory blocks, 1) the identity of the recognized units (whether they can be immediately incorporated or not) and 2) the locations of the units that can be incorporated in the RHI memory are continuously updated.

1. As units are groups into memory blocks, a flag (i.e., "Identity-Flag") is set to "One" to indicate when unit(s) can be embedded. It should be noted that this flag is defined for each memory block and that it could be set more than one time for the same memory block (for example, when the user strikes through a line of text). This flag is checked in steps 4.1-4.3 of FIG. 5 and is reset to "Zero" after the recognized unit(s) is embedded, i.e., in step 6.1 of the subroutine in FIG. 5, and at initialization. It should be noted that the "Identity" flag discussed above is irrelevant when all recognized units associated with a memory block are embedded all at once; under this scenario and after the handwritten information is concluded, recognized, grouped and stored in the proper locations of the RHI memory, the "All Units" flag in step 6.1 of FIG. 4 will be set to "One" by the GMB functionality 30 of FIG. 9, to indicate that all units can be embedded.

2. As units are grouped into memory blocks, a pointer for memory block, i.e., the "Next memory block pointer" 31, is updated every time a new memory block is introduced (i.e., when a recognized unit(s) that is not yet ready to be embedded is introduced; when the "Identity" flag is Zero), and every time a memory block is embedded into the document memory 22, such that the pointer will always point to the location of the memory block that is ready (when it is ready) to be embedded. This pointer indicates to the subroutines Embedd1 (of FIG. 12) and Embedd2 (of FIG. 14) the exact location of the relevant memory block with the recognized unit(s) that is ready to be embedded (as in step 1.2 of these subroutines).

An example of a scenario under which the "next memory block pointer" 31 is updated is when a handwritten input related to changing font size has begun, then another handwritten input related to changing colors has begun (Note that these two commands cannot be incorporated until after they are concluded), and then another handwritten input for deleting text has begun (Note that this command may be embedded as soon as the GMB functionality identify it).

Figure 14:
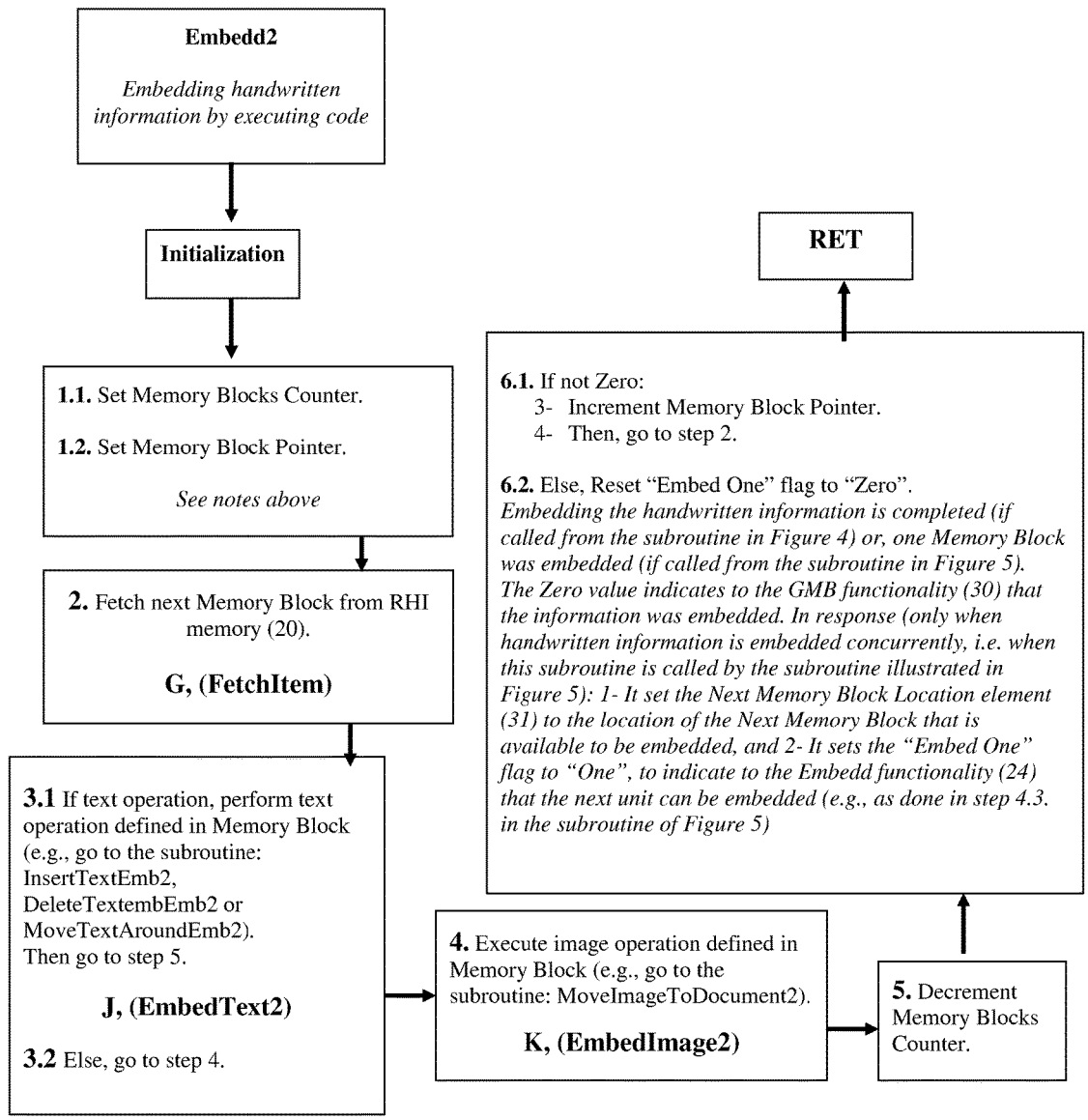
FIG. 14 is a flow chart representing subroutine D of FIG. 4 and FIG. 5 according to the second embodiment illustrating the running of programs.
Figure 15:
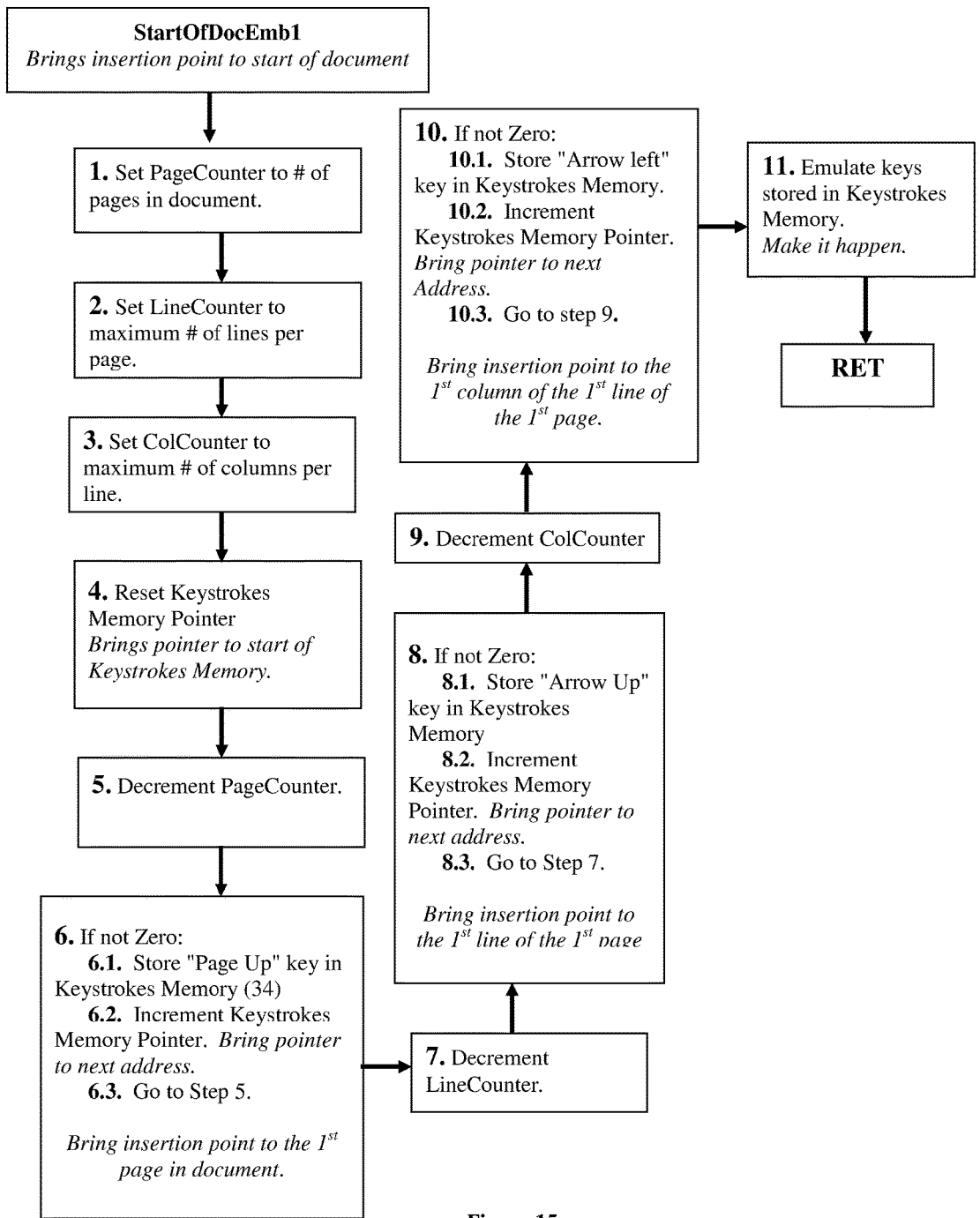
FIG. 15 through FIG. 20 are flow charts of subroutine H referenced in FIG. 12 for the first three symbol operations illustrated in FIG. 7 and according to the generic routines illustrated in FIG. 8.
Figure 16:
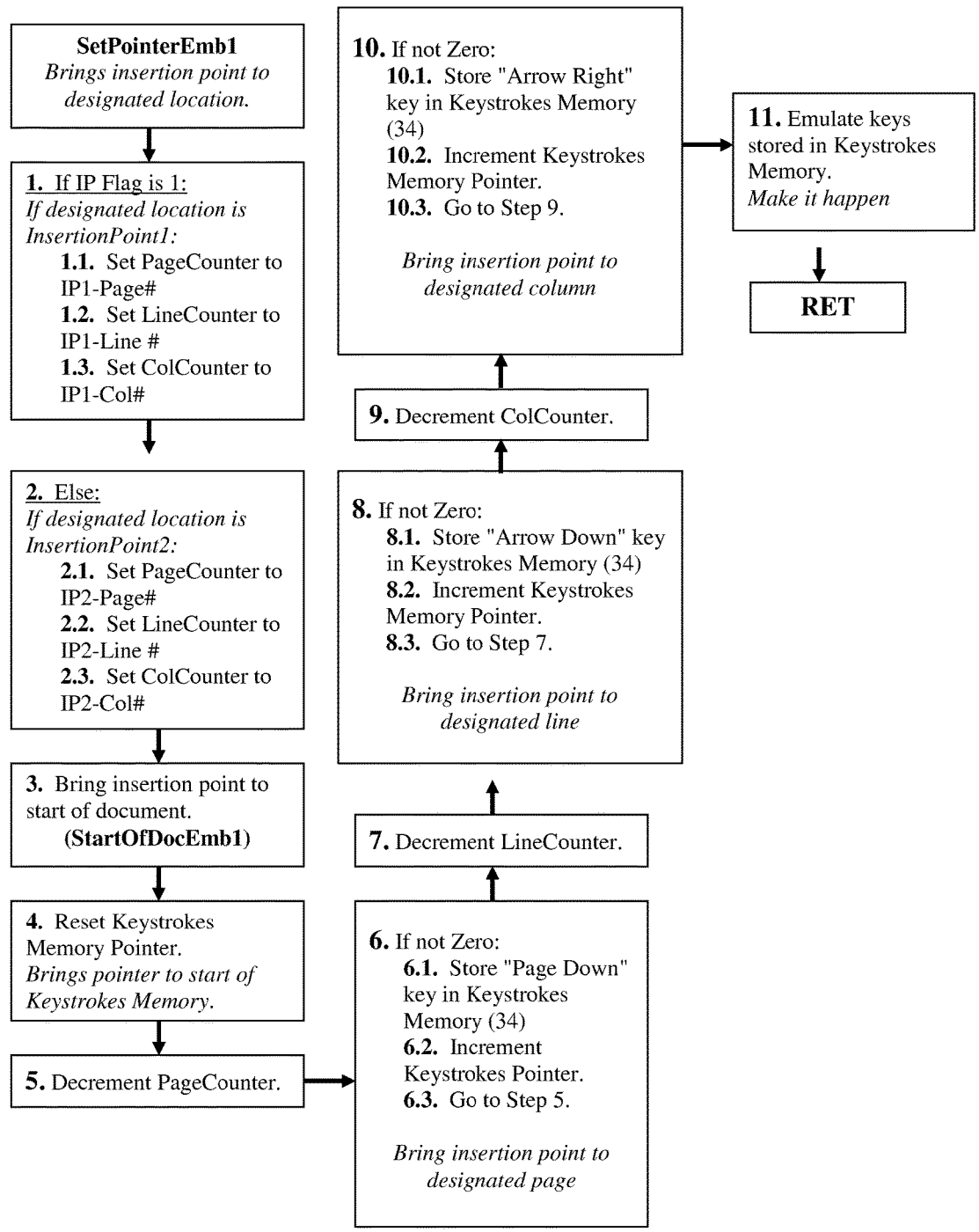
Figure 17:
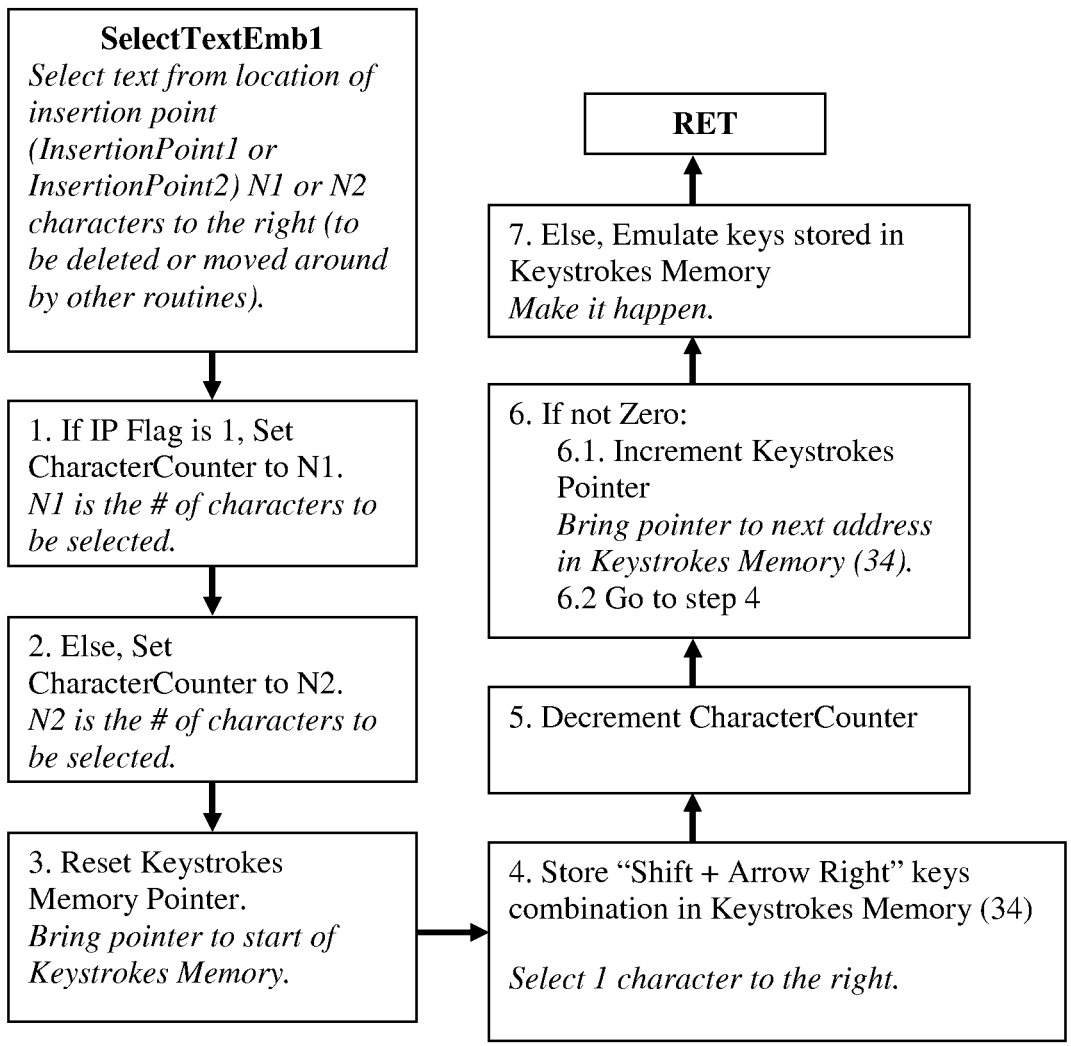
Figure 18:
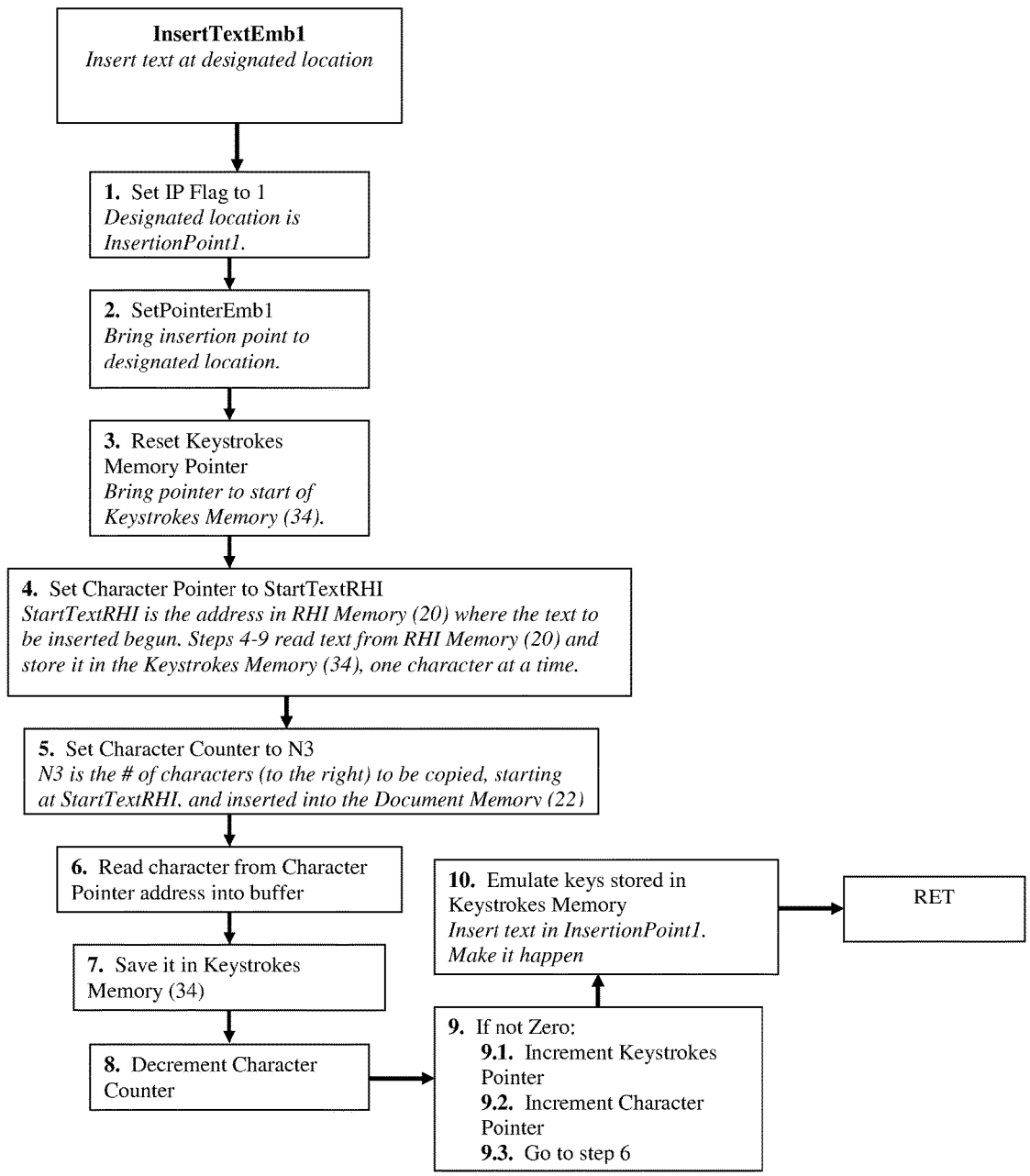
Figure 19:
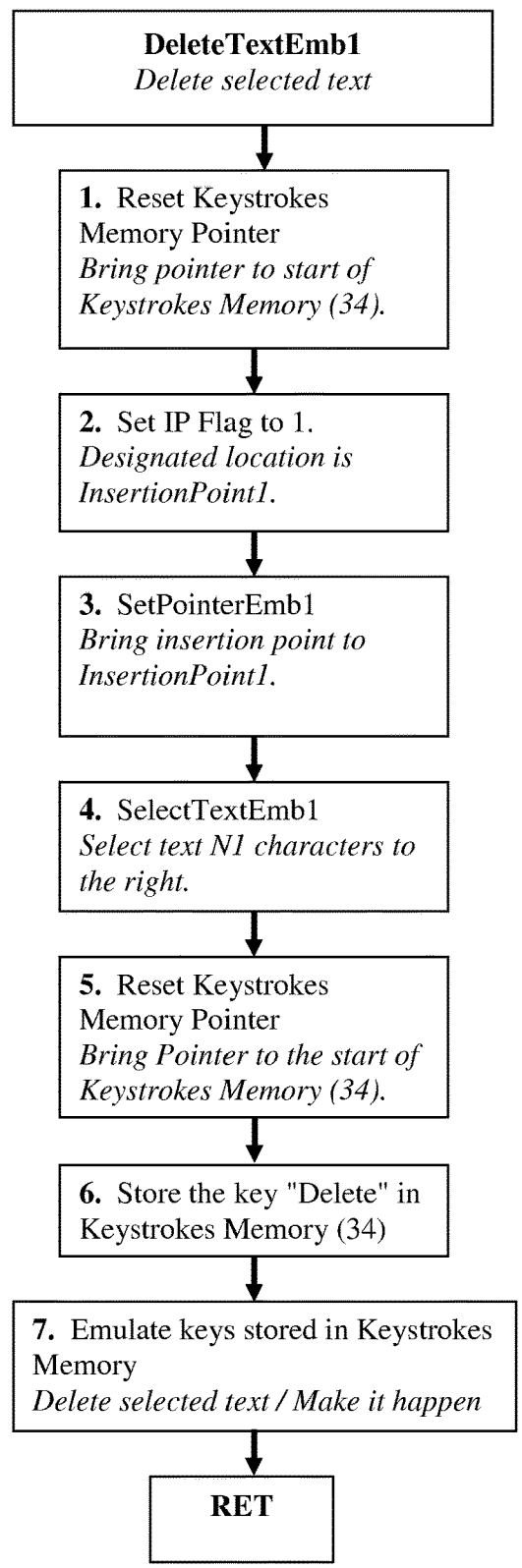
Figure 20:
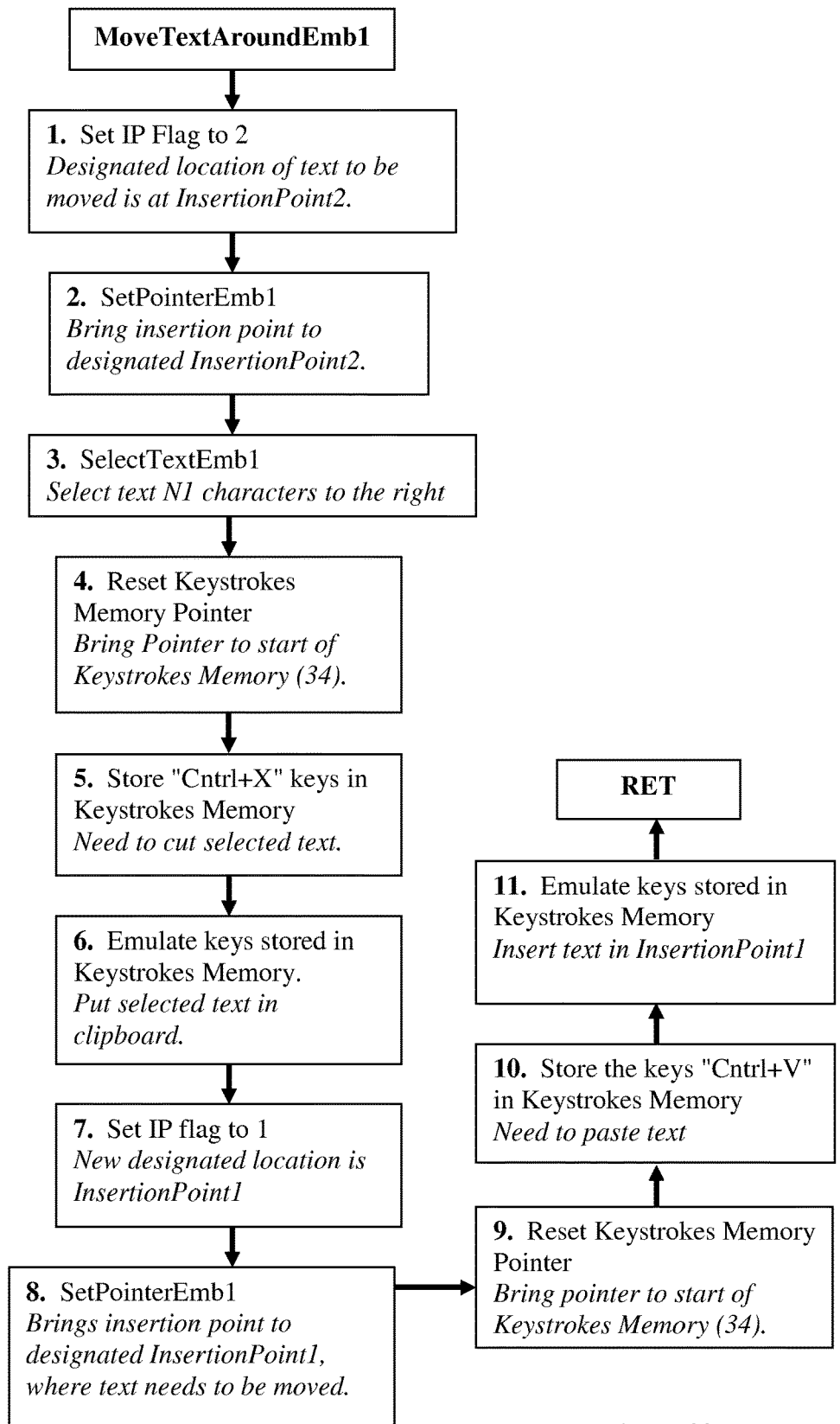

The value in the "# of memory blocks" 33 indicates the number of memory blocks to be embedded. This element is set by the GMB functionality 30 and used in step 1.1 of the subroutines illustrated in FIG. 12 and FIG. 14. This counter is relevant when the handwritten information is embedded all at once after its conclusion, i.e., when the subroutines of FIG. 12 and FIG. 14 are called from the subroutine illustrated in FIG. 4 (i.e., it is not relevant when they are called from the subroutine in FIG. 5; its value then is set to "One", since in this embodiment, memory blocks are embedded one at a time).

Embodiment One

Figure 11:
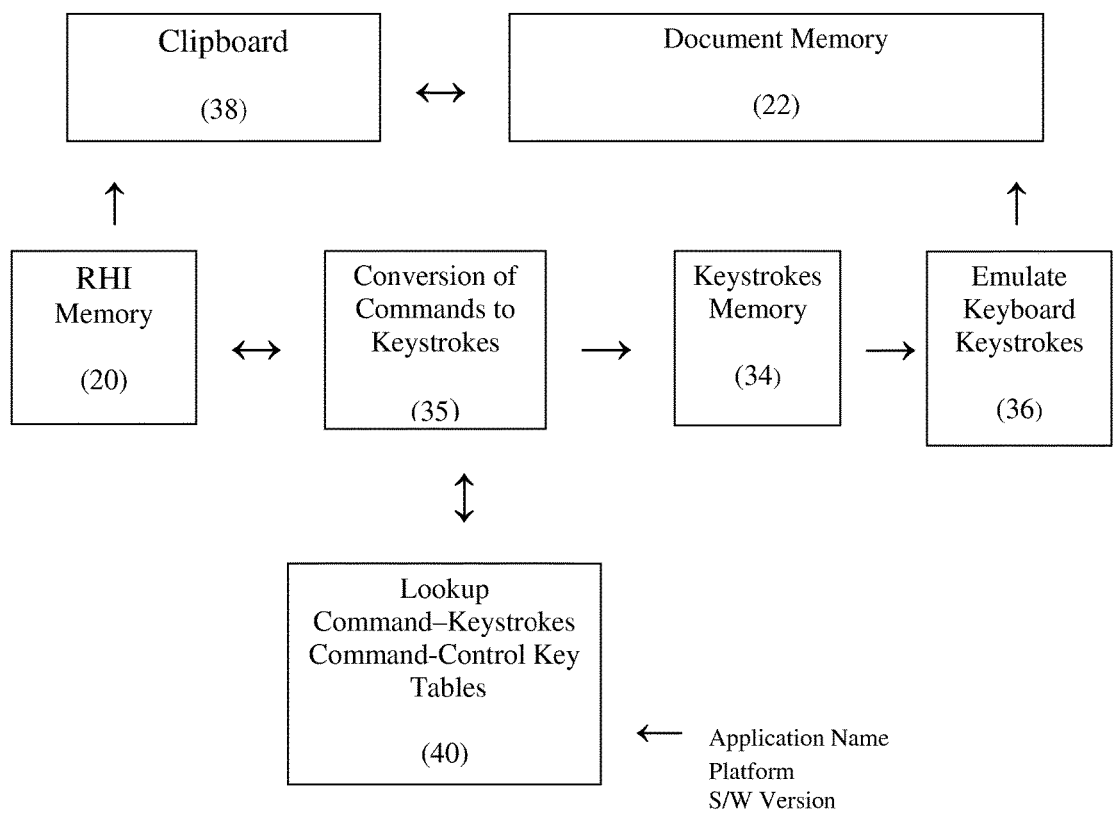
FIG. 11 is an example of data flow of the embedded element of FIG. 1 and FIG. 38 according to the first embodiment illustrating the emulating of keyboard keystrokes.

FIG. 11 is a block schematic diagram illustrating the basic functional blocks and data flow according to Embodiment One. The text of these and all other figures is largely self-explanatory and need not be repeated herein. Nevertheless, the text thereof may be the basis of claim language used in this document.

Figure 12:
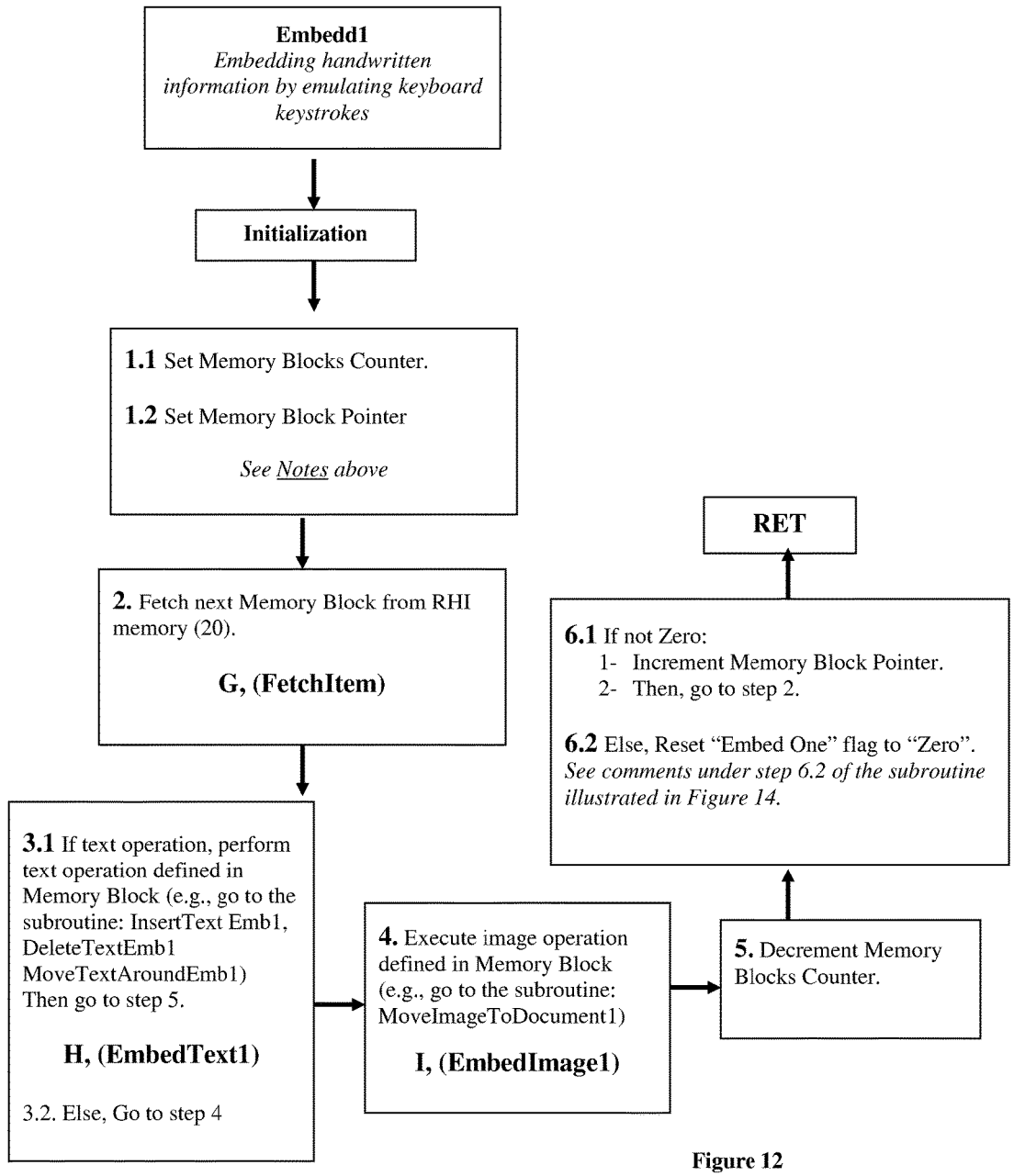
FIG. 12 is a flow chart representing subroutine D of FIG. 4 and FIG. 5 according to the first embodiment using techniques to emulate keyboard keystrokes.

FIG. 12 is a flow chart example of the Embed subroutine D referenced in FIG. 4 and FIG. 5 according to Embodiment One. The following is to be noted.

1. When this subroutine is called by the routine illustrated in FIG. 5 (i.e., when handwritten information is embedded concurrently): 1) memory block counter (in step 1.1) is set to 1, and 2) memory block pointer is set to the location in which the current memory block to be embedded is located; this value is defined in memory block pointers element (31) of FIG. 9.

2. When this subroutine is called by the subroutine illustrated in FIG. 4 (i.e., when all handwritten information is embedded after all handwritten information is concluded): 1) memory block pointer is set to the location of the first memory block to be embedded, and 2) memory block counter is set to the value in # of memory blocks element (33) of FIG. 9.

In operation, memory blocks 32 are fetched one at a time from the RHI memory 20 (G) and processed as follows:

Memory Blocks Related to Text Revisions (H):

Commands are converted to keystrokes (35) in the same sequence as the operation is performed via the keyboard and then stored in sequence in the keystrokes memory 34. The emulate keyboard element 36 uses this data to emulate the keyboard, such that the application reads the data as it was received from the keyboard (although this element may include additional keys not available via a keyboard such as the symbols illustrated in FIG. 7, e.g. for insertion of new text in MS Word document). The clipboard 38 can handle insertion of text, or text can be emulated as keyboard keystrokes. The lookup tables 40 determines the appropriate control key(s) and keystroke sequences for pre-recorded and built-in macros that, when emulated, execute the desired command. These keyboard keys are application-dependent and are a function of parameters, such as application name, software version and platform. Some control keys, such as the arrow keys, execute the same commands in a large array of applications; however, this assumption is excluded from the design in FIG. 11, i.e., by the inclusion of the lookup table command-keystrokes in element 40 of FIG. 11. Although, in the flow charts in FIGS. 15-20, it is assumed that the following control keys execute the same commands (in the applications that are included): "Page Up", "Page Down", "Arrow Up", "Arrow Down", "Arrow Right" and "Arrow Left" (For moving the insertion point within the document), "Shift+Arrow Right" (for selection of text), and "Delete" for deleting a selected text. Preferably, element 40 include lookup tables for a large array of applications, although it could include tables for one or any desired number of applications.

Memory Blocks Related to New Image (I):

The image (graphic) is first copied from the RHI memory 20, more specifically, based on information in the memory block 32, into the clipboard 38. Its designated location is located in the document memory 22 via a sequence of keystrokes (e.g., via the arrow keys). It is stored (i.e., pasted from the clipboard 38 by the keystrokes sequence: Cntr-V) into the document memory 22. If the command involves another operation, such as "Reduce Image Size" or "Move image", the image is first identified in the document memory 22 and selected. Then the operation is applied by the appropriate sequences of keystrokes.

Figure 8:
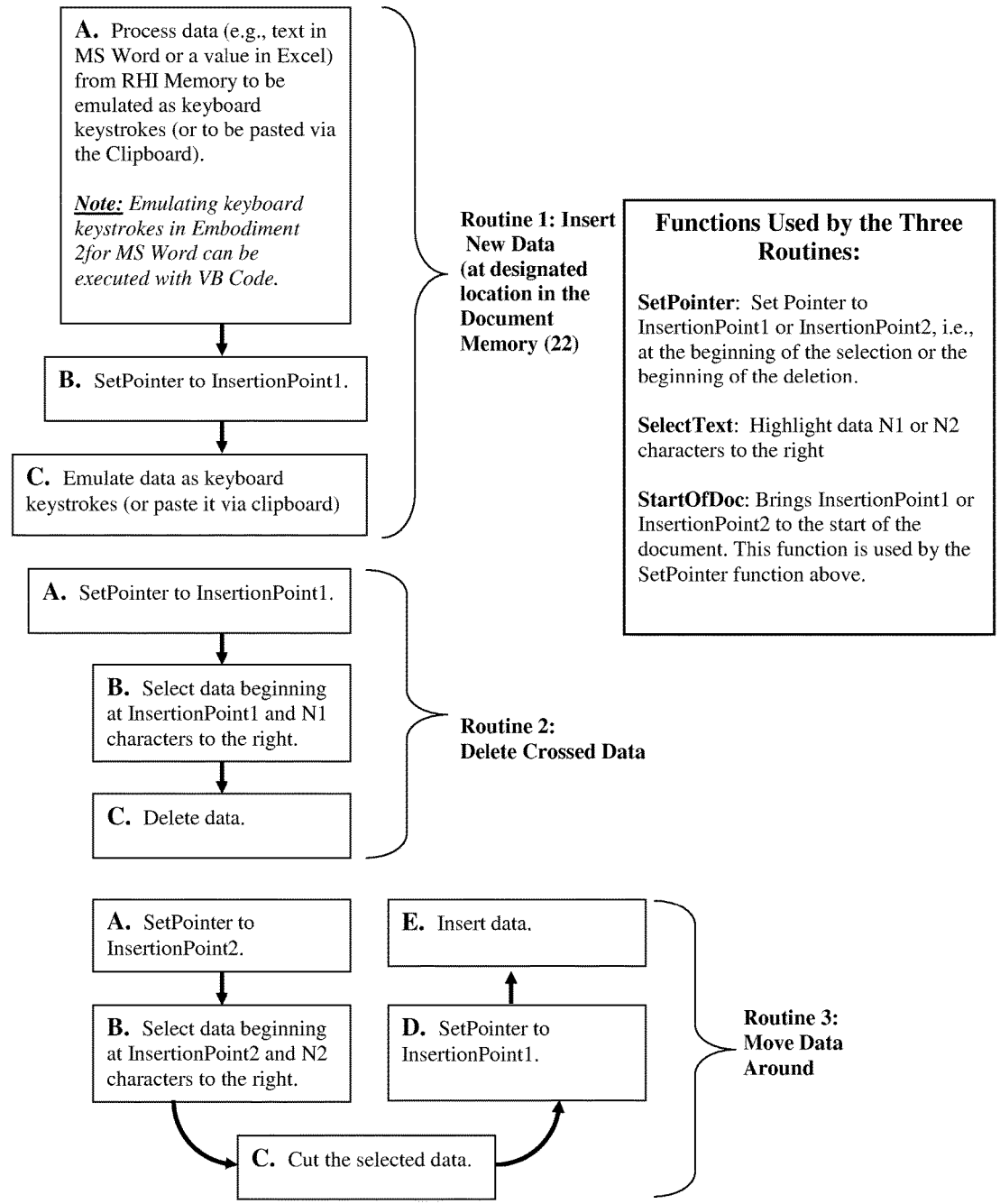
FIG. 8 is a listing that provides generic routines for each of the first 3 symbol operations illustrated in FIG. 7.

FIG. 15 through FIG. 20, the flow charts of the subroutines H referenced in FIG. 12, illustrate execution of the first three basic text revisions discussed in connection with and in FIG. 8 for MS Word and other applications. These flow charts are self-explanatory and are therefore not further described herein but are incorporated into this text. The following points are to be noted with reference to the function StartOfDocEmb1 illustrated in the flow chart of FIG. 15:

1. This function is called by the function SetPointeremb1, illustrated in FIG. 16.

2. Although, in many applications, the shortcut keys combination "Cntrl+Home" will bring the insertion point to the start of the document (including MS Word), this routine was written to execute the same operation with the arrow keys.

3. Designated x-y locations in the document memory 22 in this subroutine are defined based on Page#, Line# & Column#; other subroutines are required when the x-y definition differs.

Figure 21:
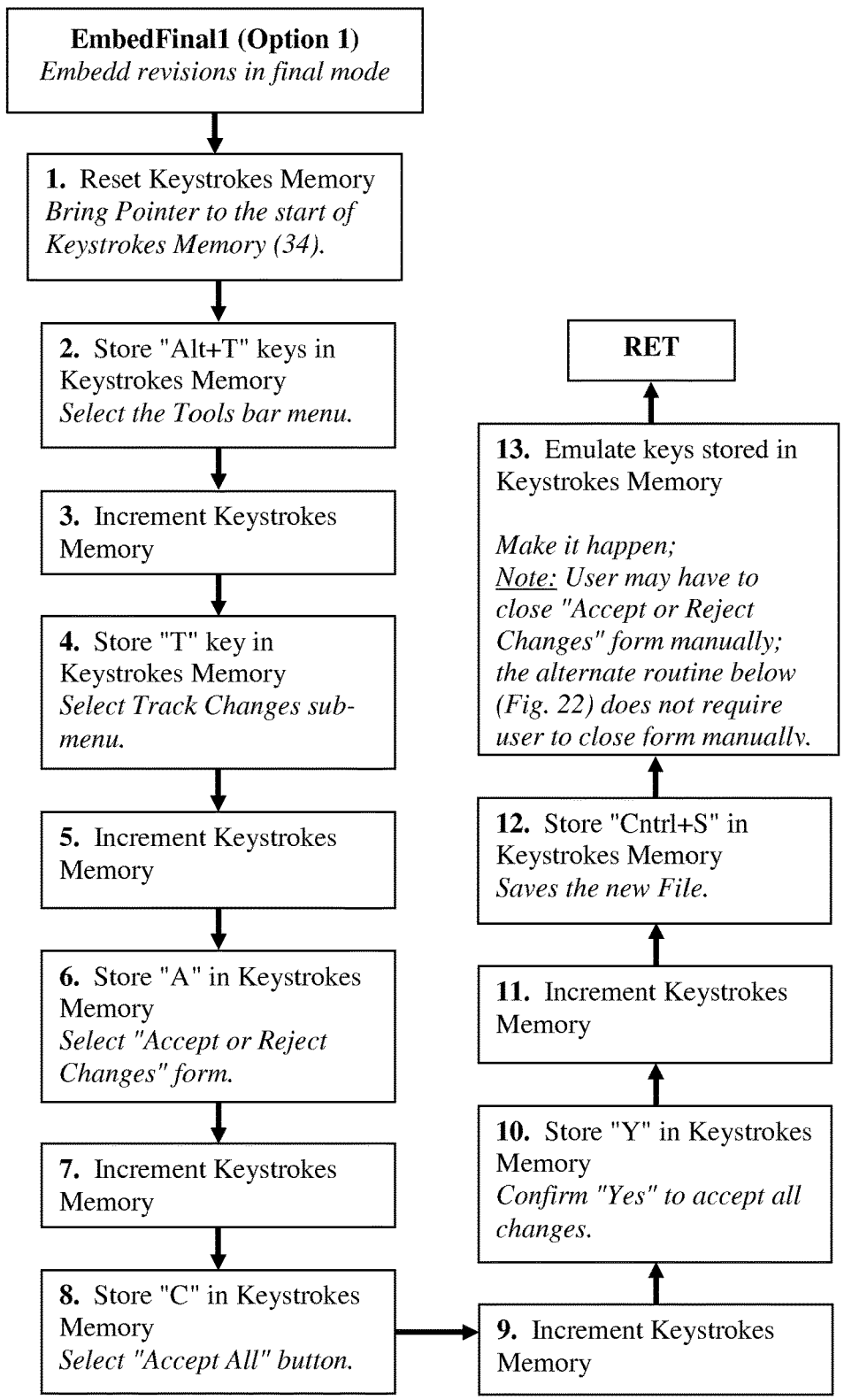
FIG. 21 is a flow chart of subroutine L referenced in FIG. 4 and FIG. 5 for concluding the embedding of revisions for a Microsoft Word type document, according to the first embodiment using techniques to emulate keyboard keystrokes.
Figure 22:
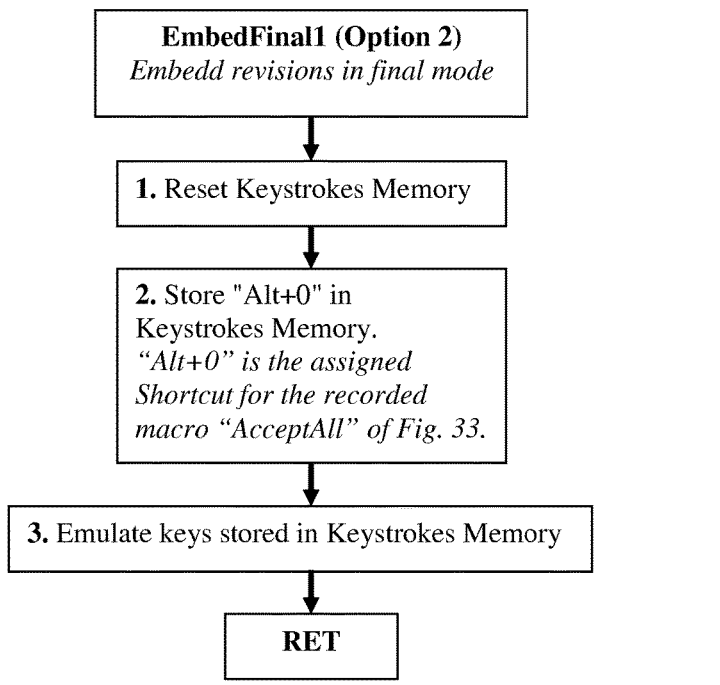
FIG. 22 is a flow chart of an alternative to subroutine L of FIG. 21 for concluding revisions for MS Word type document.
Figure 23:
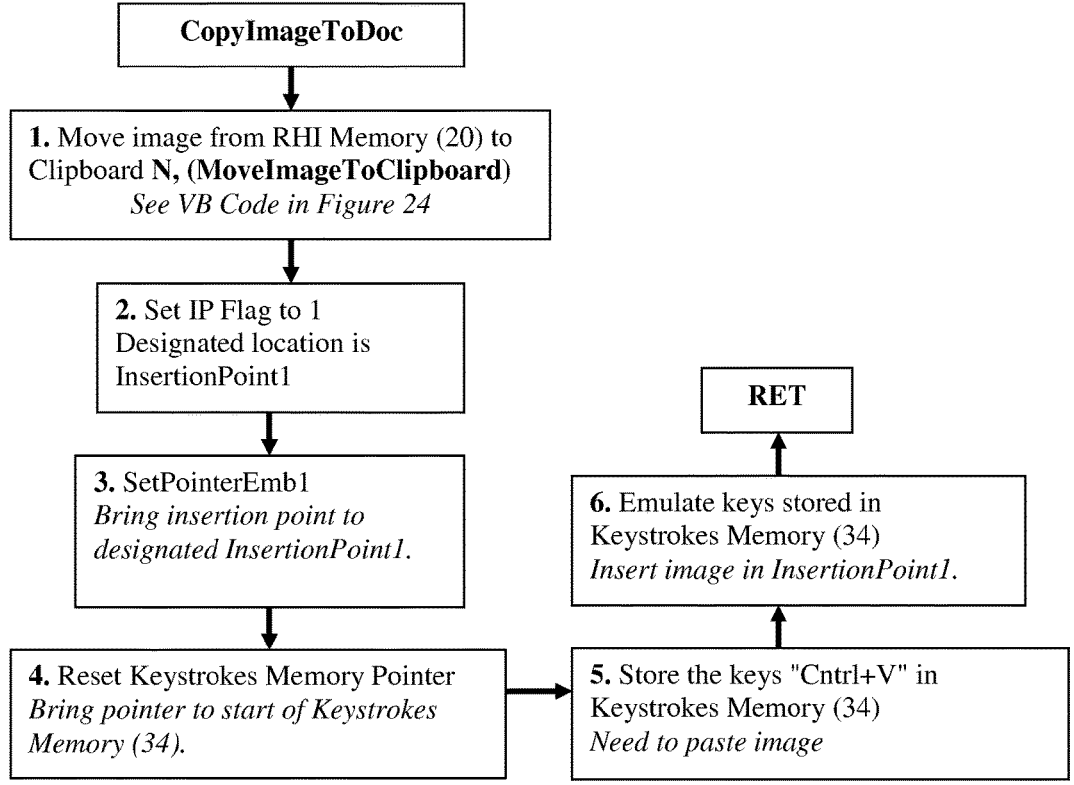
FIG. 23 is a sample flow chart of the subroutine I referenced in FIG. 12 for copying a recognized image from the RHI memory and placing it in the document memory via a clipboard.

Once all revisions are embedded, they are incorporated in final mode according to the flow chart illustrated in FIG. 21 or according to the flow chart illustrated in FIG. 22. In this implementation example, the Track Changes feature is used to "Accept All Changes" which embed all revisions as an integral part of the document.

As discussed above, a basic set of keystrokes sequences can be used to execute a basic set of commands for creation and revision of a document in a large array of applications. For example, the arrow keys can be used for jumping to a designated location in the document. When these keys are used in conjunction with the Shift key, a desired text/graphic object can be selected. Further, clipboard operations, i.e., the typical combined keystroke sequences Cntrl-X (for Cut), Cntrl-C (for Copy) and Cntrl-V (for Paste), can be used for basic edit/revision operations in many applications. It should be noted that, although a relatively small number of keyboard control keys are available, the design of an application at the OEM level is unlimited in this regard. (See for example FIGS. 1-5). It should be noted that the same key combination could execute different commands. For example, deleting an item in QuarkXpres is achieved by the keystrokes Cntrl-K, where the keystrokes Cntrl-K in MS Word open a hyperlink. Therefore, the ConvertText1 function H determines the keyboard keystroke sequences for commands data stored in the RHI memory by accessing the lookup table command-keystrokes command-control-key 40 of FIG. 11.

The Use of Macros:

Execution of handwritten commands in applications such as Microsoft Word, Excel and Word Perfect is enhanced with the use of macros. This is because sequences of keystrokes that can execute desired operations may simply be recorded and assigned to shortcut keys. Once the assigned shortcut key(s) are emulated, the recorded macro is executed. Below are some useful built-in macros for Microsoft Word. For simplification, they are grouped based on the operations used to embed handwritten information (D).

Bringing the Insertion Point to a Specific Location in the Document:
CharRight, CharLeft, LineUp, LineDown, StartOfDocument, StartOfLine, EndOfDocument, EndOfLine, EditGoto, GotoNextPage, GotoNextSection, GotoPreviousPage, GotoPreviousSelection, GoBack Selection:
CharRightExtent, CharLeftExtend, LineDownExtend, LineUpExtend, ExtendSelection, EditFind, EditReplace Operations on Selected Text/Graphic:
EditClear, EditCopy, EditCut, EditPaste,
CopyText, FontColors, FontSizeSelect, GrowFont, ShrinkFont, GrowFontOnePoint, ShrinkFontOnePoint, AllCaps, SmallCaps, Bold, Italic, Underline, UnderlineCoor, UnderlineStyle, WordUnderline, ChangeCase, DoubleStrikethrough, Font, FontColor, FontSizeSelect Displaying Revisions:
Hidden, Magnifier, Highlight, DocAccent, CommaAccent, DottedUnderline, DoubleUnderline, DoubleStrikethrough, HtmlSourceRefresh, InsertFieldChar (for enclosing a symbol for display), ViewMasterDocument, ViewPage, ViewZoom, ViewZoom100, ViewZoom200, ViewZoom75

Images:
InsertFrame, InsertObject, InsertPicture, EditCopyPicture, EditCopyAsPicture, EditObject, InsertDrawing, InsertFram, InsertHorizentlLine File Operations:
FileOpen, FileNew, FileNewDefault, DocClose, FileSave, SaveTemplate If a macro has no shortcut key assigned to it, it can be assigned by the following procedure:

Clicking on the Tools menu and selecting Customize causing the Customize form to appear. Clicking on the Keyboard button brings the dialog box Customize Keyboard. In the Categories box all the menus are listed, and in the Commands box all their associated commands are listed. Assigning a shortcut key to a specific macro can be simply done by selecting the desired built-in macro in the command box and pressing the desired shortcut keys.

Combinations of macros can be recorded as a new macro; the new macro runs whenever the sequence of keystrokes that is assigned to it is emulated. In the same manner, a macro in combination with keystrokes (e.g., of arrow keys) may be recorded as a new macro. It should be noted that recording of some sequences as a macro may not be permitted.

The use of macros, as well as the assignment of a sequence of keys to macros can also be done in other word processors, such as WordPerfect.

Figure 36:
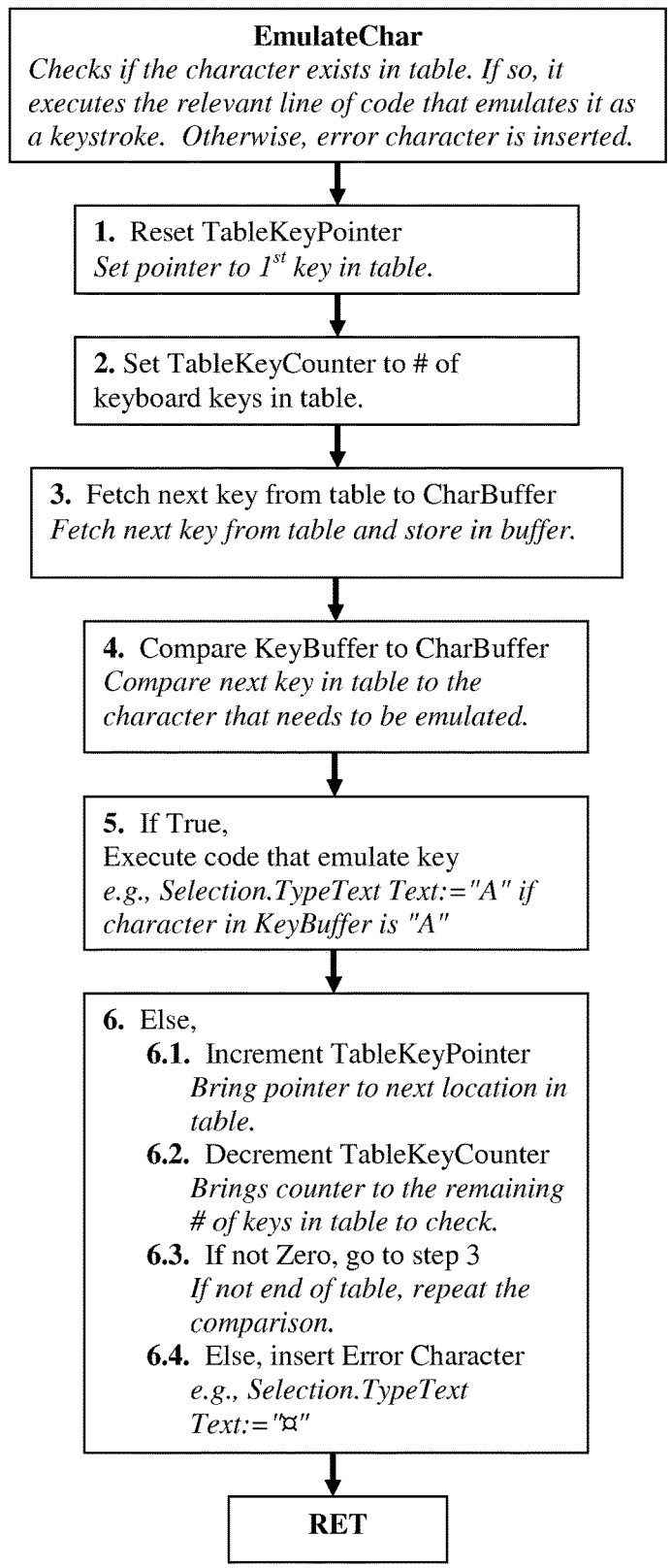
FIG. 36 is a flow chart of a process for checking if a handwritten character to be emulated as a keyboard keystroke exists in table and thus can be emulated and, if so, for executing the relevant line of code that emulates the keystroke.
Figure 37:
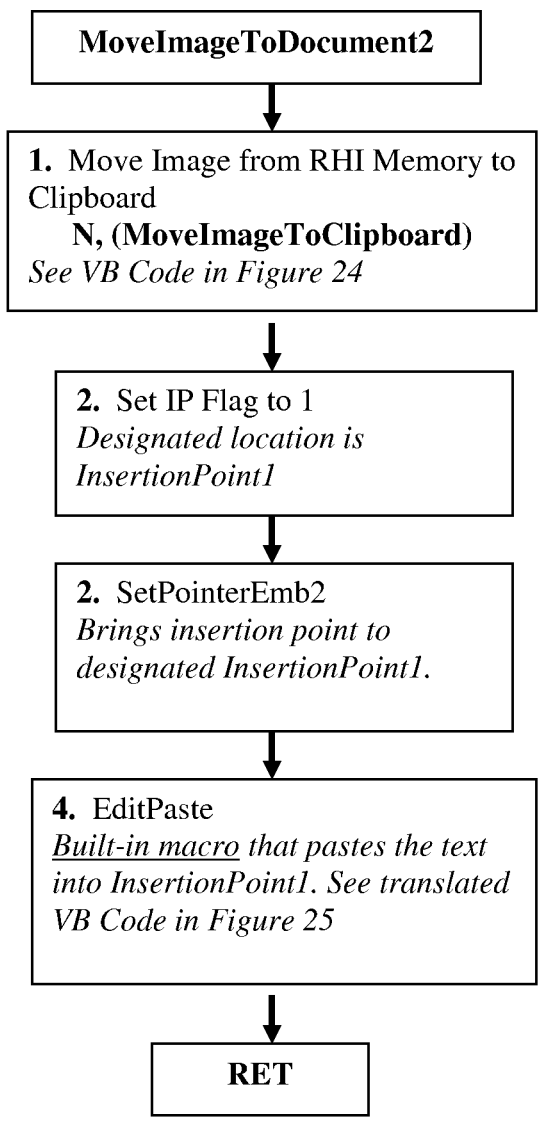
FIG. 37 is a flow chart of an example for subroutine K in FIG. 14 for copying a recognized image from RHI memory and placing it in the document memory via the clipboard.

Emulating a keyboard key 36 in applications with built-in programming capability, such as Microsoft Word, can be achieved by running code that is equivalent to pressing that keyboard key. Referring to FIG. 35 and FIG. 36, details of this operation are presented. The text thereof is incorporated herein by reference. Otherwise, emulating the keyboard is a function that can be performed in conjunction with Windows or other computer operating systems.

Embodiment Two

Figure 13:
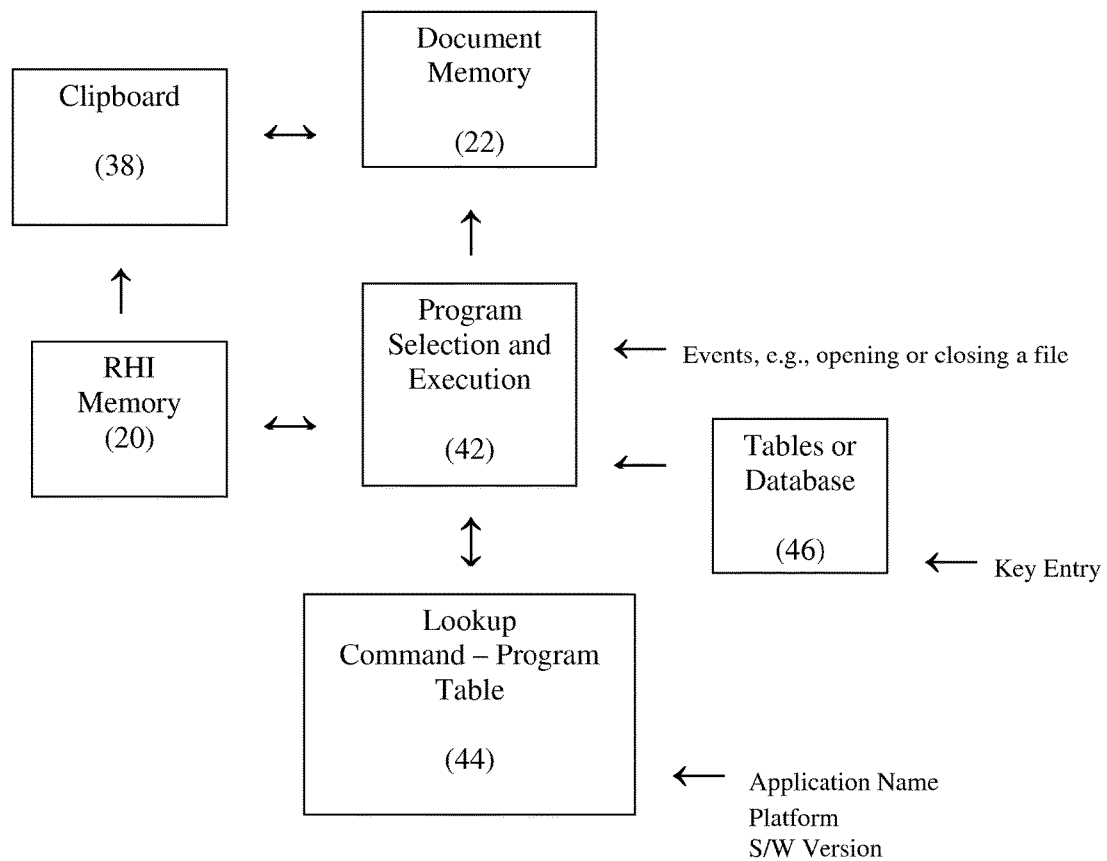
FIG. 13 is an example of data flow of the embedded element of FIG. 1 and FIG. 38 according to the second embodiment illustrating the running of programs.

FIG. 13 is a block schematic diagram illustrating the basic functional blocks and data flow according to Embodiment Two. FIG. 14 is a flow chart example of the Embed function D referenced in FIG. 4 and in FIG. 5 according to Embodiment Two. Memory blocks are fetched from the RHI memory 20 (G) and processed. Text of these figures is incorporated herein by reference. The following should be noted with FIG. 14:

1. When this subroutine is called by the routine illustrated in FIG. 5 (i.e., when handwritten information is embedded concurrently): 1) memory block counter (in step 1.1 below) is set to 1, and 2) memory block pointer is set to the location in which the current memory block to be embedded is located; this value is defined in memory block pointers element (31) of FIG. 9.

2. When this subroutine is called by the subroutine illustrated in FIG. 4 (i.e., when all handwritten information is embedded after all handwritten information is concluded): 1) memory block Pointer is set to the location of the first memory block to be embedded, and 2) memory block counter is set to the value in # of memory blocks element (33) of FIG. 9.

A set of programs executes the commands defined in the memory blocks 32 of FIG. 9, one at a time. FIG. 26 through FIG. 32, with text incorporated herein by reference, are flow charts of the subroutine J referenced in FIG. 14. The programs depicted execute the first three basic text revisions discussed in FIG. 8 for MS Word. These sub-routines are self-explanatory and are not further explained here, but the text is incorporated by reference.

FIG. 33 is the code in Visual Basic that embeds the information in Final Mode, i.e., Accept All Changes" of the Track Changes, which embeds all revisions to be an integral part of the document.

Each of the macros referenced in the flow charts of FIG. 26 through FIG. 32 needs to be translated into executable code such as VB Script or Visual Basic code. If there is uncertainty as to which method or property to use, the macro recorder typically can translate the recorded actions into code. The translated code for these macros to Visual Basic is illustrated in FIG. 25.

The clipboard 38 can handle the insertion of text into the document memory 22, or text can be emulated as keyboard keystrokes. (Refer to FIGS. 35-36 for details). As in Embodiment One, an image operation (K) such as copying an image from the RHI memory 20 to the document memory 22 is executed as follow: an image is first copied from the RHI memory 20 into the clipboard 3/8. Its designated location is located in the document memory 22. Then it is pasted via the clipboard 38 into the document memory 22.

The selection of a program by the program selection and execution element 42 is a function of the command, the application, software version, platform, and the like. Therefore, the ConvertText2 J selects a specific program for command data that are stored in the RHI memory 20 by accessing the lookup command-programs table 44. Programs may also be initiated by events, e.g., when opening or closing a file, or by a key entry, e.g., when bringing the insertion point to a specific cell of a spreadsheet by pressing the Tab key.

In Microsoft Word, the Visual Basic Editor can be used to create very flexible, powerful macros that include Visual Basic instructions that cannot be recorded from the keyboard. The Visual Basic Editor provides additional assistance, such as reference information about objects and properties or an aspect of its behavior.

Working with the Comment Feature as an Insertion Mechanism

Incorporating the handwritten revisions into the document through the Comment feature may be beneficial in cases where the revisions are mainly insertion of new text into designated locations, or when plurality of revisions in various designated locations in the document need to be indexed to simplify future access to revisions; this can be particularly useful for large documents under review by multiple parties.

Each comment can be further loaded into a sub-document which is referenced by a comment # (or a flag) in the main document. The Comments mode can also work in conjunction with Track Changes mode.

For Embodiment One: Insert Annotation can be achieved by emulating the keystrokes sequence Alt+Cntrl+M. The Visual Basic translated code for the recorded macro with this sequence is "Selection.Comments.Add Range:=Selection.Range", which could be used to achieve the same result in embodiment 2.

Once in Comment mode, revisions in the RHI memory 20 can be incorporated into the document memory 22 as comments. If the text includes revisions, the Track Changes mode can be invoked prior to insertion of text into a comment pane.

Useful Built-in Macros for Use in the Comment Mode of MS Word:

GotoCommentScope; highlight the text associated with a comment reference mark

GotoNextComment; jump to the next comment in the active document

GotoPreviousComment; jump to the previous comment in the active document

InsertAnnotation; insert comment

DeleteAnnotation; delete comment

ViewAnnotation; show or hide the comment pane

The above macros can be used in Embodiment One by emulating their shortcut keys or in Embodiment Two with their translated code in Visual Basic. FIG. 34 provides the translated Visual Basic code for each of these macros.

Spreadsheets, Forms and Tables

Embedding handwritten information in a cell of a spreadsheet or a field in a form or a table can either be for new information or it could be for revising an existing data (e.g., deletion, moving data between cells or for adding new data in a field). Either way, after the handwritten information is embedded in the document memory 22, it can cause the application (e.g., Excel) to change parameters within the document memory 22, e.g., when the embedded information in a cell is a parameter of a formula in a spreadsheet which when embedded changes the output of the formula, or when it is a price of an item in a Sales Order which when embedded changes the subtotal of the Sales Order; if desired, these new parameters may be read by the embed functionality 24 and displayed on the display 25 to provide the user with useful information such as new subtotals, spell check output, stock status of an item (e.g., as a sales order is filed in).

As discussed, the x-y location in the document memory 22 for a word processing type documents can for example be defined by page#, line# and character# (see FIG. 10, x-y locations for InsertionPoint1 and InsertionPoint2). Similarly, the x-y location in the document memory 22 for a form, table or a spreadsheet can for example be defined based on the location of a cell/field within the document (e.g., column #, Row # and Page # for a spreadsheet). Alternatively, it can be defined based on number of Tabs and/or Arrow keys from a given known location. For example, a field in a Sales Order in the accounting application QuickBooks can be defined based on the number of Tab from the first field (i.e., "customer; job") in the form.

Figure 26:
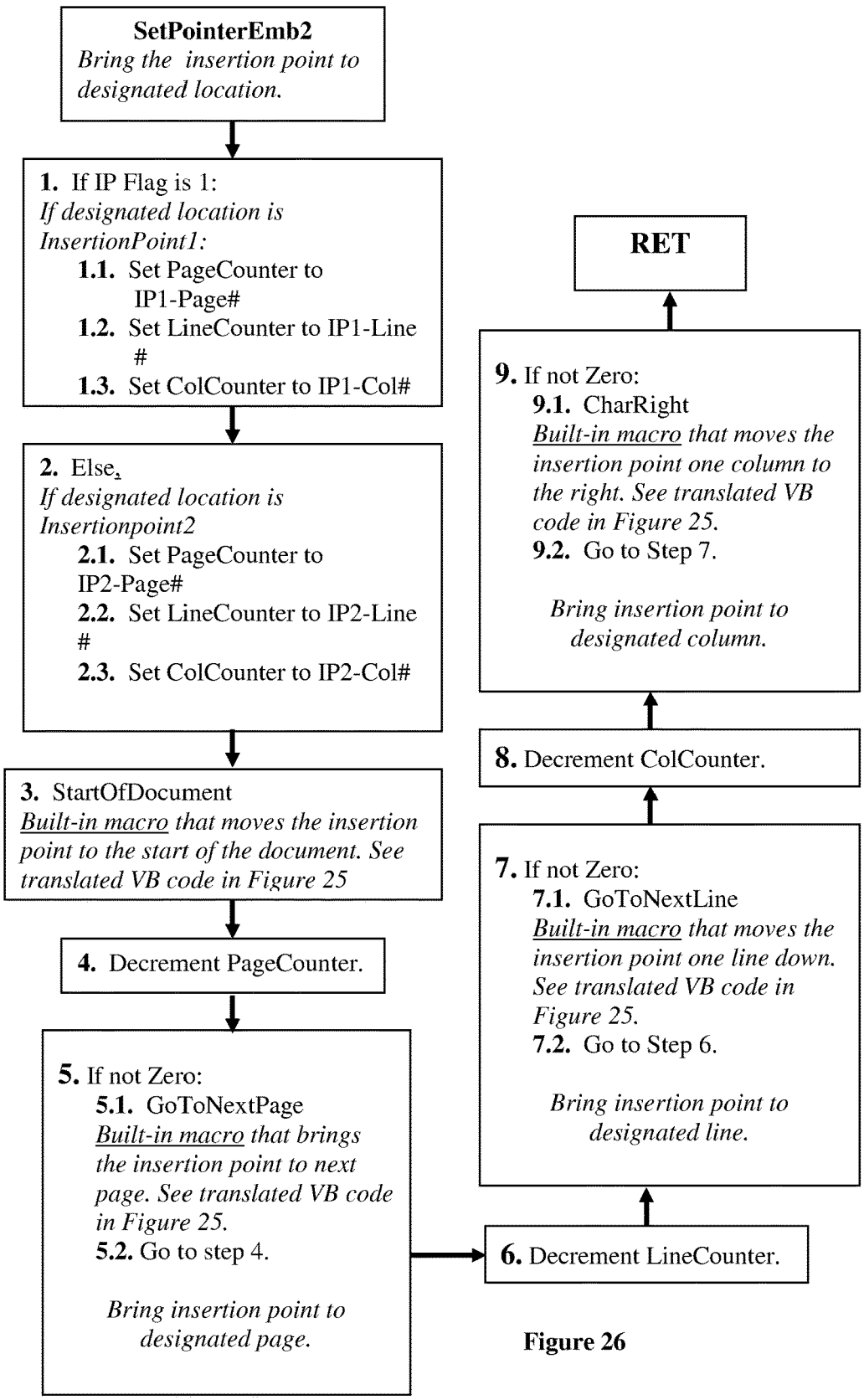
FIG. 26 through FIG. 32 are flow charts of subroutine J referenced in FIG. 14 for the first three symbol operations illustrated in FIG. 7 and according to the generic routines illustrated in FIG. 8 for MS Word.
Figure 27:
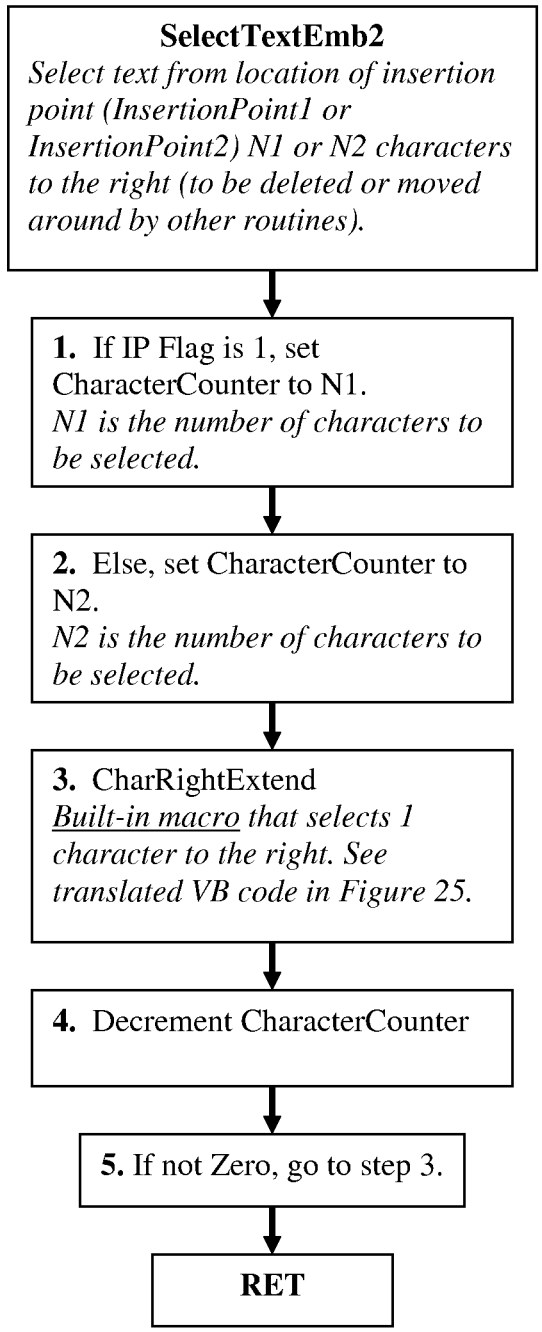
Figure 28:
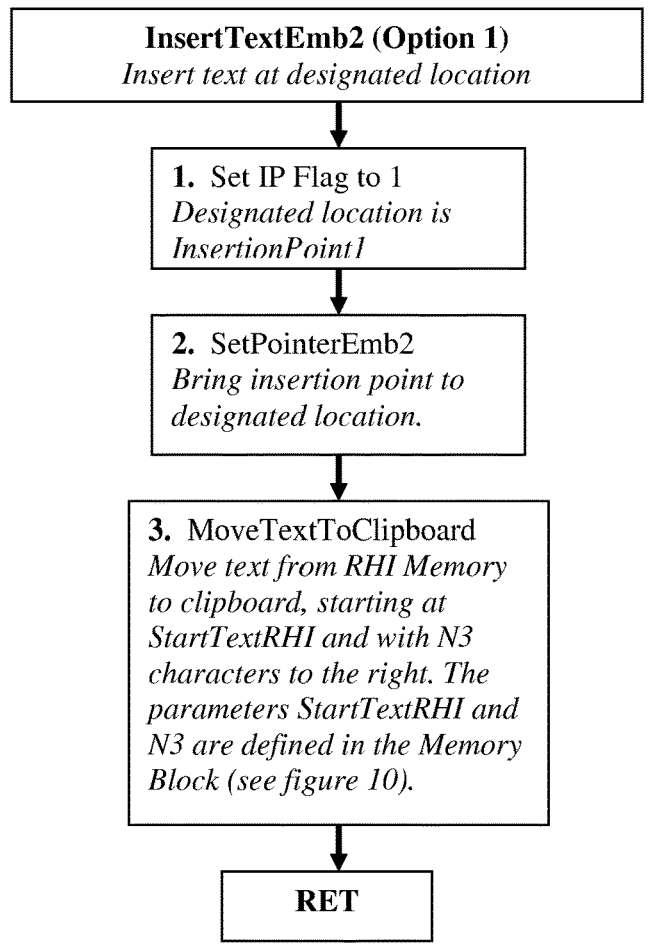
Figure 29:
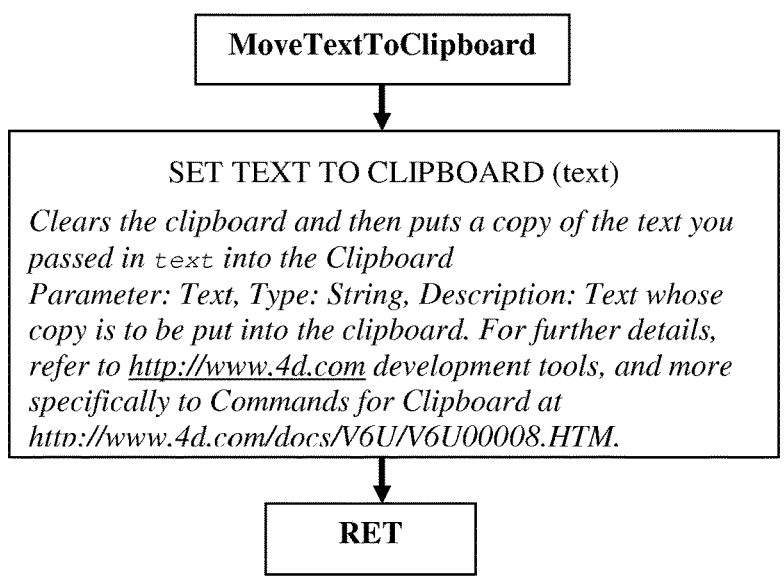
Figure 30:
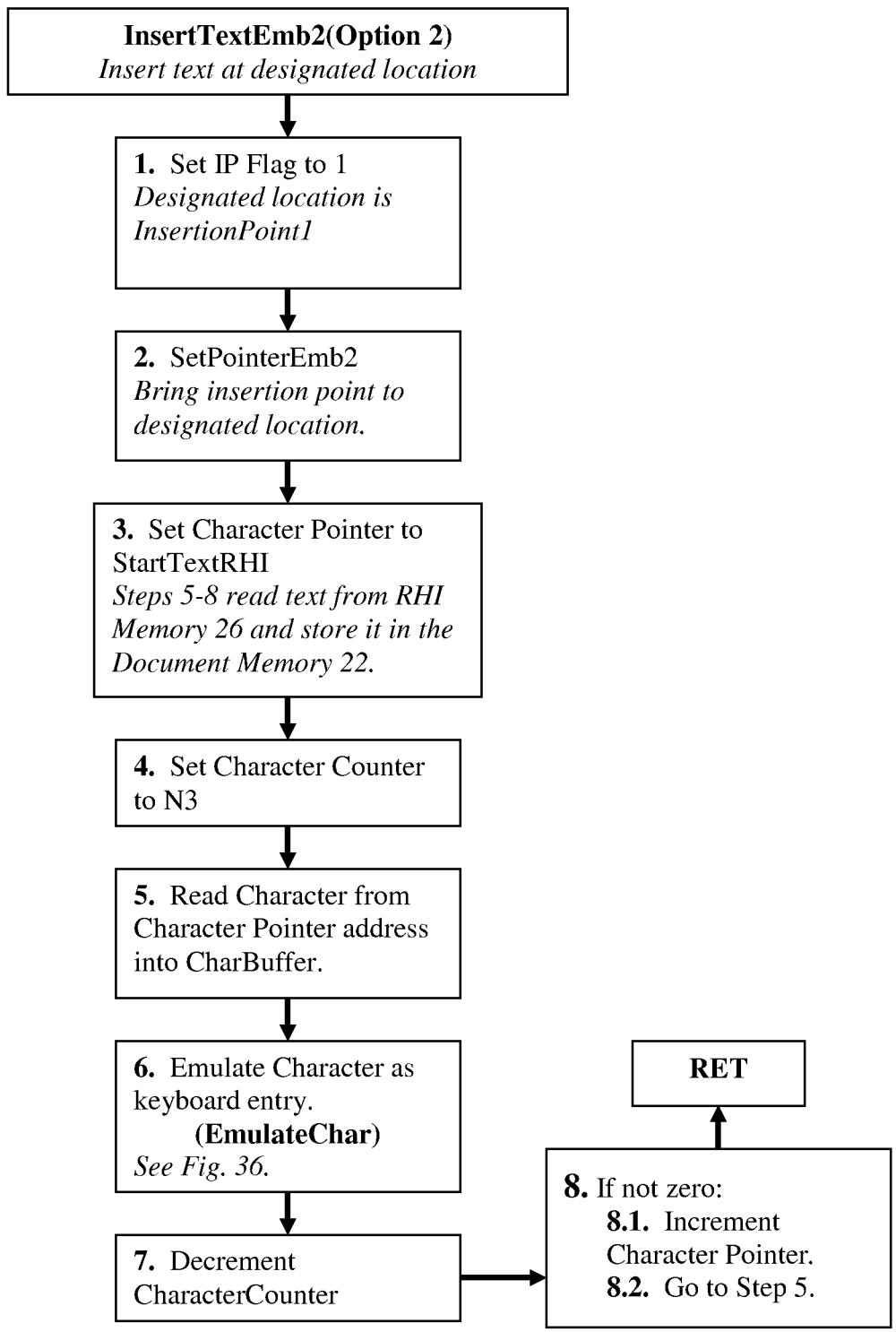
Figure 31:
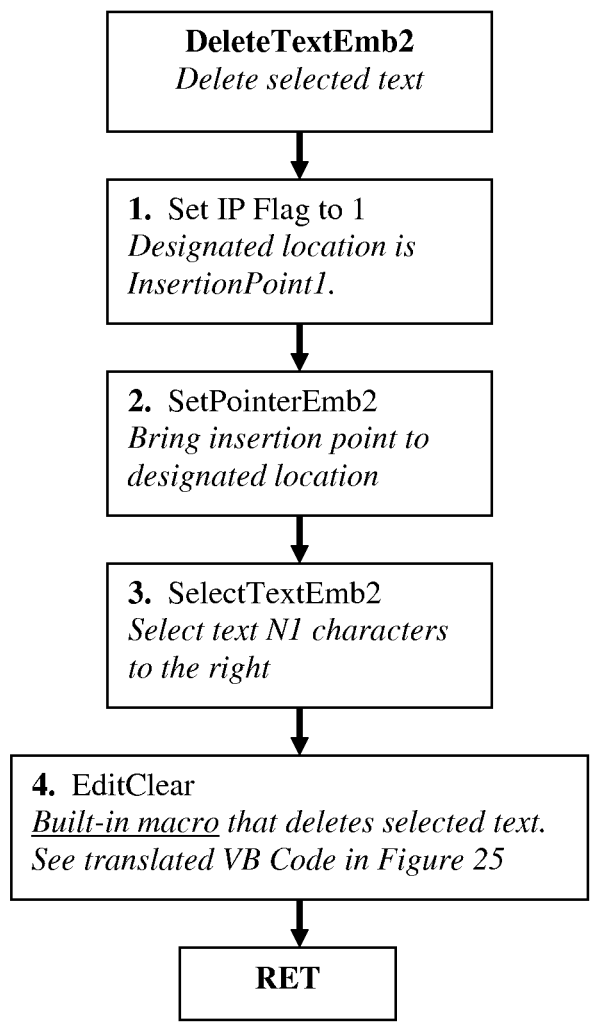
Figure 32:
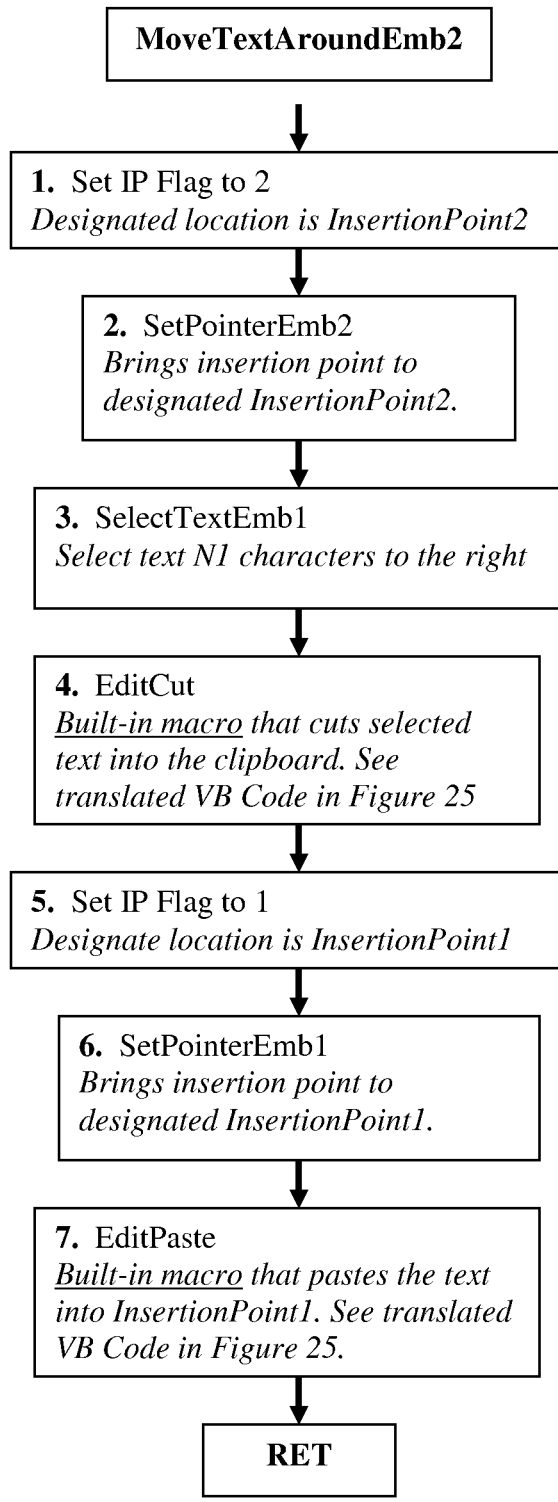

The embed functionality can read the x-y information (see step 2 in flow charts referenced in FIGS. 12 and 14), and then bring the insertion point to the desired location according to Embodiment One (see example flow charts referenced in FIGS. 15-16), or according to Embodiment Two (see example flow charts for MS Word referenced in FIG. 26). Then the handwritten information can be embedded. For example, for a Sales Order in QuickBooks, emulating the keyboard keys combination "Cntrl+J" will bring the insertion point to the first field, customer; job; then, emulating three Tab keys will bring the insertion point to the "Date" field, or emulating eight Tab keys will bring the insertion point to the field of the first "Item Code".

The software application QuickBooks has no macros or programming capabilities. Forms (e.g., Sales Order, a Bill, or a Purchase Order) and Lists (e.g., Chart of Accounts and customer; job list) in QuickBooks can either be invoked via pull-down menus via the toolbar, or via a shortcut key. Therefore, Embodiment One could be used to emulate keyboard keystrokes to invoke specific form or a specific list. For example, invoking a new invoice can be achieved by emulating the keyboard keys combination "Cntrl+N" and invoking the chart of accounts list can be achieved by emulating the keyboard keys combination "Cntrl+A". Invoking a Sales Order, which has no associated shortcut key defined, can be achieved by emulating the following keyboard keystrokes:

1. "Alt+C"; brings the pull-down menu from the toolbar menu related to "Customers"
2. "Alt+O"; Invokes a new sales order form Once a form is invoked, the insertion point can be brought to the specified x-y location, and then the recognized handwritten information (i.e., command(s) and associated text) can be embedded.

As far as the user is concerned, he can either write the information (e.g., for posting a bill) on a pre-set form (e.g., in conjunction with the digitizing pad 12 or touch screen 11) or specify commands related to the operation desired. Parameters, such as the type of entry (a form, or a command), the order for entering commands, and the setup of the form are selected by the user in step 1 "Document Type and Preferences Setup" (A) illustrated in FIG. 4 and in FIG. 5.

For example, the following sequence handwritten commands will post a bill for purchase of office supply at OfficeMax on Mar. 2, 2005, for a total of $45. The parameter "office supply", which is the account associated with the purchase, may be omitted if the vendor OfficeMax has already been set up in QuickBooks. Information can be read from the document memory 22 and based on this information the embed functionality 24 can determine if the account has previously been set up or not, and report the result on the display 25. This, for example can be achieved by attempting to cut information from the "Account" field (i.e., via the clipboard), assuming the account is already set up. The data in the clipboard can be compared with the expected results, and based on that, generating output for the display.

Bill
03/02/05
OfficeMax
$45
Office supply

In applications such as Excel, either or both Embodiment One and Embodiment Two can be used to bring the insertion point to the desired location and to embed recognized handwritten information.

Applications Examples

Wireless Pad

A wireless pad can be used for transmission of an integrated document to a computer and optionally receiving back information that is related to the transmitted information. It can be used, for example, in the following scenarios:
1—Filling up a form at a doctor office
2—Filling up an airway bill for shipping a package
3—Filling up an application for a driver license at the DMV
4—Serving a customer at a car rental agency or at a retail store.
5—Taking notes at a crime seen or at an accident site
6—Order taking off-site, e.g., at conventions.

Handwritten information can be inserted in designated locations in a pre-designed document such an order form, an application, a table or an invoice, on top of a digitizing pad 12 or using a touch screen 11 or the like. The pre-designed form is stored in a remote or a close-by computer. The handwritten information can be transmitted via a wireless link concurrently to a receiving computer. The receiving computer will recognize the handwritten information, interpret it and store it in a machine code into the pre-designed document. Optionally, the receiving computer will prepare a response to and transmit it back to the transmitting pad (or touch screen), e.g., to assist the user.

For example, information filled out on the pad 12 in an order form at a convention can be transmitted to an accounting program or a database residing in a close-by or remote server computer as the information is written. In turn, the program can check the status of an item, such as cost, price and stock status, and transmit information in real-time to assist the order taker. When the order taker indicates that the order has been completed, a sales order or an invoice can be posted in the remote server computer.

Figure 39:
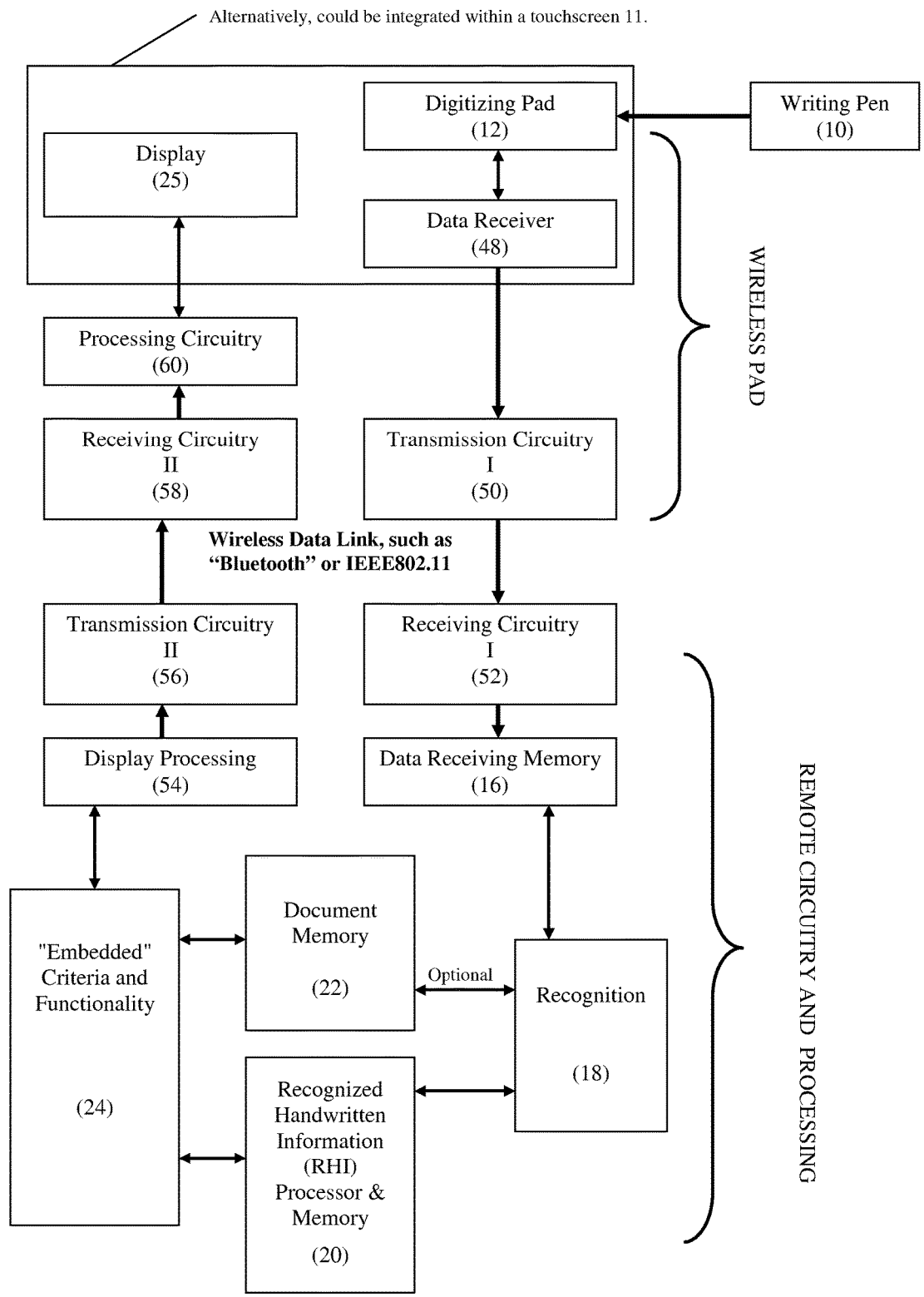
FIG. 39 is a schematic diagram of an integrated edited document made with the use of a wireless pad.

FIG. 39 is a schematic diagram of an Integrated Edited Document System shown in connection with the use of a Wireless Pad. The Wireless Pad comprises a digitizing pad 12, display 25, data receiver 48, processing circuitry 60, transmission circuitry I 50, and receiving circuitry II 58. The digitizing pad receives tactile positional input from a writing pen 10. The transmission circuitry I 50 takes data from the digitizing pad 12 via the data receiver 48 and supplies it to receiving circuitry I 52 of a remote processing unit. The receiving circuitry II 58 captures information from display processing 54 via transmission circuitry II 56 of the remote circuitry and supplies it to processing circuitry 60 for the display 25. The receiving memory I 52 communicates with the data receiving memory 16 which interacts with the recognition module 18 as previously explained, which in turn interacts with the RHI processor and memory 20 and the document memory 22 as previously explained. The embedded criteria and functionality element 24 interacts with the elements 20 and 22 to modify the subject electronic document and communicate output to the display processing unit 54.

Remote Communication

In a communication between two or more parties at different locations, with this invention handwritten information can be incorporated into a document, information can be recognized and converted into machine-readable text and image and incorporated into the document as "For Review". As discussed in connection with FIG. 6 (as an exemplary embodiment for MS Word type document), "For review" information can be displayed in a number of ways. The "For Review" document can then be sent to one or more receiving parties (e.g., via email). The receiving party may approve portions or all of the revisions and/or revise further in handwriting (as the sender has done) via the digitized pad 12, via the touch screen 11 or via a wireless pad. The document can then be sent again "for review". This process may continue until all revisions are incorporated/concluded.

Revisions Via Fax

With this invention, handwritten information on a page (with or without machine-printed information) can be sent via fax, and the receiving facsimile machine enhanced as a Multiple Function Device (printer/fax, character recognizing scanner) can convert the document into a machine-readable text/image for a designated application (e.g., Microsoft Word). Revisions vs. original information can be distinguished and converted accordingly based on designated revision areas marked on the page (e.g., by underlining or circling the revisions). Then it can be sent (e.g., via email) "For Review" (as discussed above, under "Remote Communication").

Integrated Document Editor with the Use of a Cell Phone

Handwritten information can be entered on a digitizing pad 12 whereby locations on the digitizing pad 12 correspond to locations on the cell phone display. Alternatively handwritten information can be entered on a touch screen that is used as a digitizing pad as well as a display (i.e., similar to the touch screen 11 referenced in FIG. 38). Handwritten information can either be new information, or revision of an existing stored information (e.g., a phone number, contact name, to do list, calendar events, an image photo, etc.). Handwritten information can be recognized by the recognition element 18, processed by the RHI element 20 and then embedded into the document memory 22 (e.g., in a specific memory location of a specific contact information). Embedding the handwritten information can, for example, be achieved by directly accessing locations in the document memory (e.g., specific contact name); however, the method by which recognized handwritten information is embedded can be determined at the OEM level by the manufacturer of the phone.

Use of the Integrated Document Editor in Authentication of Handwritten Information A unique representation such as a signature, a stamp, a finger print or any other drawing pattern can be pre-set and fed into the recognition element 18 as units that are part of a vocabulary or as a new character. When handwritten information is recognized as one of these pre-set units to be placed in a, e.g., specific expected x-y location of the digitizing pad 12 (FIG. 1) or touch screen 11 (FIG. 38), an authentication or part of an authentication will pass. The authentication will fail if there is no match between the recognized unit and the pre-set expected unit. This can be useful for authentication of a document (e.g., an email, a ballot or a form) to insure that the writer/sender of the document is the intended sender. Other examples are for authentication and access of bank information or credit reports. The unique pre-set patterns can be either or both: 1) stored in a specific platform belonging to the user and/or 2) stored in a remote database location. It should be noted that the unique pre-set patterns (e.g., a signature) do not have to be disclosed in the document. For example, when an authentication of a signature passes, the embedded functionality 24 will, for example embedd the word "OK" in the signature line/field of the document.

The invention has now been explained with reference to specific embodiments. Other embodiments will be evident to those of skill in the art without departing from the spirit and scope of the invention. Therefore it is not intended for the invention to be limited, except as indicated by the appended claims.

I claim:

1. A computing device, comprising:
a touch screen, configured to
display a representation of at least one portion of a document, wherein one or more portions of the document comprise a plurality of document locations, each accessible by one or more operations, and
accept, in memory of the computing device, data representing user input within the displayed representation; and
one or more processing units, configured to automatically:
identify a user chosen command based on one or more changes in positional locations within the user input,
define a region on the touch screen, and
identify a document location within user chosen locations, based on:
said document location as represented on the touch screen being within said region and in proximity to or at a user selected positional location within the user input, and
said document location being capable of being one of said user chosen locations at which to apply said user chosen command to at least one text character, wherein:
said user chosen locations within said plurality of document locations are automatically determined, and
said region is defined to encompass allowed variation between said document location as represented on the touch screen and said user selected positional location, to compensate for human error.

2. The computing device according to claim 1, wherein:
said document location is further identified based on: said document location as represented on the touch screen being a closest location represented on the touch screen within the region to said user selected positional location, and
said closest location being within document locations of which each is capable of being one of said user chosen locations.

3. The computing device according to claim 1 wherein said region is further defined based on at least one of said plurality of document locations as represented on the touch screen being within said region.

4. A computing device, comprising:
a touch screen, configured to
display a representation of at least one portion of a document, wherein one or more portions of the document comprise a plurality of document locations, each accessible by one or more operations, and
accept, in memory of the computing device, data representing user input on the touch screen, associated with the displayed representation; and
one or more processing units, configured to
determine a user chosen command based on one or more user selected positional locations within the user input,
automatically define a region on the touch screen, and
automatically identify a document location within user chosen locations, based on:
said document location as represented on the touch screen being within said region and in proximity to or at a user selected positional location within the user input, and
said document location being capable of being one of said user chosen locations at which to apply said user chosen command to at least one text character, wherein:
said user chosen locations within said plurality of document locations are automatically determined, and
said computing device is configured to generate at least one of an audible signal and a visual signal indicative of said proximity associated with said user selected positional location.

5. A computing device, comprising:
a touch screen, configured to
display a representation of at least one portion of a document, wherein one or more portions of the document comprise a plurality of document locations, each accessible by one or more operations, and accept, in memory of the computing device, data representing user input on the touch screen, associated with the displayed representation; and one or more processing units, configured to determine a user chosen command based on one or more user selected positional locations within the user input, automatically define a region on the touch screen, and automatically identify a document location within user chosen locations, based on:
- said document location as represented on the touch screen being within said region and in proximity to or at a user selected positional location within the user input, and
- said document location being capable of being one of said user chosen locations at which to apply said user chosen command to at least one text character, wherein:

said user chosen locations within said plurality of document locations are automatically determined, and said computing device is configured to generate at least one of an audible signal and a visual signal to aid a user in pointing closer to a positional location on the touch screen within the user input associated with said document location.

6. A computing device, comprising:

a touch screen, configured to display a representation of at least one portion of a document, wherein said at least one portion of the document comprises a plurality of document locations, each accessible by one or more operations, and accept, in memory of the computing device, data representing user input within the displayed representation; and one or more processing units, configured to automatically:

identify a user chosen command based on one or more changes in positional locations within the user input, define a region on the touch screen, and identify a document location within a range of user chosen locations, based on:
- said document location as represented on the touch screen being within said region and in proximity to or at a user selected positional location within the user input, and
- said document location being capable of being within said range of said user chosen locations at which to apply said user chosen command to a plurality of text characters, wherein:

said range of said user chosen locations within said plurality of document locations is automatically determined, and said region is defined to encompass allowed variation between said document location as represented on the touch screen and said user selected positional location, to compensate for human error.

7. The computing device according to claim 6, wherein:

said document location is further identified based on: said document location as represented on the touch screen being a closest location represented on the touch screen within the region to said user selected positional location, and said closest location being within document locations of which each is capable of being one of said user chosen locations.

8. The computing device according to claim 6 wherein said region is further defined based on at least one of said plurality of document locations as represented on the touch screen being within said region.

9. A computing device, comprising:

a touch screen, configured to display a representation of at least one portion of a document, wherein said at least one portion of the document comprises a plurality of document locations, each accessible by one or more operations, and accept, in memory of the computing device, data representing user input within the displayed representation; and one or more processing units, configured to determine a user chosen command based on one or more user selected positional locations within the user input, automatically define a region on the touch screen, and automatically identify a document location within a range of user chosen locations, based on:
- said document location as represented on the touch screen being within said region and in proximity to or at a user selected positional location within the user input, and
- said document location being capable of being within said range of said user chosen locations at which to apply said user chosen command to a plurality of text characters, wherein:

said range of said user chosen locations within said plurality of document locations is automatically determined, and said computing device is configured to generate at least one of an audible signal and a visual signal to aid a user in pointing closer to a positional location on the touch screen within the user input associated with said document location.

10. A method, comprising:

automatically identifying a user chosen command based on one or more changes in positional locations within user input, associated with displayed representation of at least one portion of a document on a touch screen of a computing device, wherein one or more portions of the document comprise a plurality of document locations, each accessible by one or more operations;

automatically defining a region on the touch screen; and automatically identifying a document location within user chosen locations, based on:
- said document location as represented on the touch screen being within said region and in proximity to at a user selected positional location within the user input, or said document location being of: text character or graphic element, of which at least one portion as represented on the touch screen being within said region and in proximity to or at said user selected positional location, and
- said document location being capable of being one of said user chosen locations at which to apply said user chosen command to at least one: text character or graphic element, wherein:

said user chosen locations within said plurality of document locations are automatically determined, and said region is defined to encompass allowed variation between said document location or said portion of: text character or graphic element, as represented on the touch screen, and said user selected positional location, to compensate for human error.

11. The method according to claim 10 wherein said region is further defined based on:
- at least one of said plurality of document locations as represented on the touch screen or at least one portion of: text character or graphic element, as represented on the touch screen,
being within said region.

12. The method according to claim 10 wherein said document location is further identified based on:
said portion of: text character or graphic element, as represented on the touch screen being a closest portion of: text character or graphic element, represented on the touch screen that is within the region to said user selected positional location, or
said document location as represented on the touch screen being a closest location represented on the touch screen within the region to said user selected positional location, wherein said closest location being within document locations of which each is capable of being one of said user chosen locations.

13. A method, comprising:
determining a user chosen command based on at least one portion of user input, associated with displayed representation of at least one portion of a document on a touch screen of a computing device, wherein one or more portions of the document comprise a plurality of document locations, each accessible by one or more operations;
automatically defining a region on the touch screen;
automatically identifying a document location within user chosen locations, based on:
said document location as represented on the touch screen being within said region and in proximity to or at a user selected positional location within the user input, or said document location being of: text character or graphic element, of which at least one portion as represented on the touch screen being within said region and in proximity to or at said user selected positional location, and
said document location being capable of being one of said user chosen locations at which to apply said user chosen command to at least one: text character or graphic element, wherein said user chosen locations within said plurality of document locations are automatically determined; and
generating at least one of an audible signal and a visual signal indicative of said proximity associated with said user selected positional location.

14. A method, comprising:
determining a user chosen command based on at least one portion of user input, associated with displayed representation of at least one portion of a document on a touch screen of a computing device, wherein one or more portions of the document comprise a plurality of document locations, each accessible by one or more operations;
automatically defining a region on the touch screen;
automatically identifying a document location within user chosen locations, based on:
said document location as represented on the touch screen being within said region and in proximity to or at a user selected positional location within the user input, or said document location being of: text character or graphic element, of which at least one portion as represented on the touch screen being within said region and in proximity to at said user selected positional location, and
said document location being capable of being one of said user chosen locations at which to apply said user chosen command to at least one: text character or graphic element, wherein said user chosen locations within said plurality of document locations are automatically determined; and
generating at least one of an audible signal and a visual signal to aid a user in pointing closer to at least one positional location within the user input associated with said document location.

15. A computing device, comprising:
a touch screen, configured to
display a representation of at least one portion of a document, wherein said at least one portion of the document comprises a plurality of document locations, each accessible by one or more operations, and
accept, in memory of the computing device, data representing user input within the displayed representation; and
one or more processing units, configured to
determine a user chosen command based on one or more user selected positional locations within the user input,
automatically define a region on the touch screen, and
automatically identify a document location within a range of user chosen locations, based on:
said document location as represented on the touch screen being within said region and in proximity to or at a user selected positional location within the user input, and
said document location being capable of being within said range of said user chosen locations at which to apply said user chosen command to a plurality of text characters, wherein:
said range of said user chosen locations within said plurality of document locations is automatically determined, and
said computing device is configured to generate at least one of an audible signal and a visual signal indicative of said proximity associated with said user selected positional location.

16. The computing device according to claim 1 wherein said one or more operations are configured to automatically apply said user chosen command to one of: insert, select, delete, copy, change an attribute of, cut or move, at least one text character.

17. The computing device according to claim 6 wherein said one or more operations are configured to automatically apply said user chosen command to one of: select, delete, copy, change an attribute of, move or cut, a plurality of text characters.

18. The method according to claim 10, wherein said one or more operations are configured to automatically apply said user chosen command to one of: insert, select, delete, copy, cut, change an attribute of or move, at least one: text character or graphic element.

19. The computing device according to claim 1 wherein said to automatically identify said user chosen command based on said one or more changes in positional locations, comprises: to recognize said one or more changes in positional locations as said user chosen command.

20. The computing device according to claim 6 wherein said to automatically identify said user chosen command based on said one or more changes in positional locations, comprises: to recognize said one or more changes in positional locations as said user chosen command.

21. The method according to claim 10 wherein said identifying said user chosen command based on said one or more changes in positional locations, comprises: recognizing said one or more changes in positional locations as said user chosen command.

22. A computing device, comprising:
a touch screen, configured to
display a representation of at least one portion of a document, wherein one or more portions of the document comprise a plurality of document locations, each accessible by one or more operations, and
accept, in memory of the computing device, data representing user input within the displayed representation; and
one or more processing units, configured to automatically:
identify a user chosen command based on one or more changes in positional locations within the user input,
define a region on the touch screen, and
determine a user chosen location, based on:
said user chosen location as represented on the touch screen being within said region and in proximity to or at a user selected positional location within the user input, or said user chosen location being of: text character or graphic element, of which at least one portion as represented on the touch screen being within said region and in proximity to at said user selected positional location, and
said user chosen location within said plurality of document locations being capable of being applied at by said user chosen command to a text character or to at least one graphic element,
wherein, the region is defined to encompass allowed variation between
said user chosen location or said portion of: text character or graphic element, as represented on the touch screen, and
said user selected positional location,
to compensate for human error.

23. The computing device according to claim 22 wherein said region is further defined based on:
at least one of said plurality of document locations as represented on the touch screen or
at least one portion of: text character or graphic element, as represented on the touch screen,
being within said region.

24. The computing device according to claim 22 wherein said user chosen location is further determined based on:
said portion of: text character or graphic element, as represented on the touch screen being a closest portion of: text character or graphic element, represented on the touch screen that is within the region to said user selected positional location, or
said user chosen location as represented on the touch screen being a closest location represented on the touch screen within the region to said user selected positional location,
wherein said closest location being within document locations of which each is capable of being applied at by said user chosen command.

25. A computing device, comprising:
a touch screen, configured to
display a representation of at least one portion of a document, wherein one or more portions of the document comprise a plurality of document locations, each accessible by one or more operations, and
accept, in memory of the computing device, data representing user input on the touch screen, associated with the displayed representation; and
one or more processing units, configured to
determine a user chosen command based on one or more user selected positional locations within the user input,
automatically define a region on the touch screen, and
automatically determine a user chosen location, based on:
said user chosen location as represented on the touch screen being within said region and in proximity to or at a user selected positional location within the user input, or said user chosen location being of: text character or graphic element, of which at least one portion as represented on the touch screen being within said region and in proximity to or at said user selected positional location, and
said user chosen location within said plurality of document locations being capable of being applied at by said user chosen command to a text character or to at least one graphic element,
wherein the computing device is configured to generate at least one of an audible signal and a visual signal indicative of said proximity associated with said user selected positional location.

26. A computing device, comprising:
a touch screen, configured to
display a representation of at least one portion of a document, wherein one or more portions of the document comprise a plurality of document locations, each accessible by one or more operations, and
accept, in memory of the computing device, data representing user input on the touch screen, associated with the displayed representation; and
one or more processing units, configured to
determine a user chosen command based on one or more user selected positional locations within the user input,
automatically define a region on the touch screen, and
automatically determine a user chosen location, based on:
said user chosen location as represented on the touch screen being within said region and in proximity to or at a user selected positional location within the user input, or said user chosen location being of: text character or graphic element, of which at least one portion as represented on the touch screen being within said region and in proximity to or at said user selected positional location, and
said user chosen location within said plurality of document locations being capable of being applied at by said user chosen command to a text character or to at least one graphic element,
wherein the computing device is configured to generate at least one of an audible signal and a visual signal to aid a user in pointing closer to a positional location on the touch screen within the user input associated with said user chosen location.

27. The computing device according to claim 22 wherein said to automatically identify said user chosen command based on said one or more changes in positional locations, comprises: to recognize said one or more changes in positional locations as said user chosen command.

28. The computing device according to claim 22 wherein said one or more operations are configured to automatically apply said user chosen command to one of: insert, select, delete, copy, change an attribute of, cut or move, at least one: text character or graphic element.

29. The method according to claim 13 wherein said document location is further identified based on:
said portion of: text character or graphic element, as represented on the touch screen being a closest portion of: text character or graphic element, represented on the touch screen that is within the region to said user selected positional location, or
said document location as represented on the touch screen being a closest location represented on the touch screen within the region to said user selected positional location, wherein said closest location being within document locations of which each is capable of being one of said user chosen locations.

30. The method according to claim 13 wherein said region is a computed region based on:
at least one of said plurality of document locations as represented on the touch screen or
at least one portion of: text character or graphic element, as represented on the touch screen,
being within said computed region.

31. The method according to claim 13 wherein the region is defined to encompass allowed variation between
said document location or said portion of: text character or graphic element, as represented on the touch screen, and
said user selected positional location,
to compensate for human error.

32. The method according to claim 13 wherein said one or more operations are configured to automatically apply said user chosen command to one of: insert, select, delete, copy, cut, change an attribute of or move, at least one: text character or graphic element.

33. The method according to claim 14 wherein said document location is further identified based on:
said portion of: text character or graphic element, as represented on the touch screen being a closest portion of: text character or graphic element, represented on the touch screen that is within the region to said user selected positional location, or
said document location as represented on the touch screen being a closest location represented on the touch screen within the region to said user selected positional location, wherein said closest location being within document locations of which each is capable of being one of said user chosen locations.

34. The method according to claim 14 wherein said region is a computed region based on:
at least one of said plurality of document locations as represented on the touch screen or
at least one portion of: text character or graphic element, as represented on the touch screen,
being within said computed region.

35. The method according to claim 14 wherein the region is defined to encompass allowed variation between
said document location or said portion of: text character or graphic element, as represented on the touch screen, and
said user selected positional location,
to compensate for human error.

36. The method according to claim 14 wherein said one or more operations are configured to automatically apply said user chosen command to one of: insert, select, delete, copy, cut, change an attribute of or move, at least one: text character or graphic element.

37. The computing device according to claim 25 wherein said user chosen location is further determined based on:
said portion of: text character or graphic element, as represented on the touch screen being a closest portion of: text character or graphic element, represented on the touch screen that is within the region to said user selected positional location, or
said user chosen location as represented on the touch screen being a closest location represented on the touch screen within the region to said user selected positional location, wherein said closest location being within document locations of which each is capable of being applied at by said user chosen command.

38. The computing device according to claim 25 wherein said region is a computed region based on:
at least one of said plurality of document locations as represented on the touch screen or
at least one portion of: text character or graphic element, as represented on the touch screen,
being within said computed region.

39. The computing device according to claim 25 wherein the region is defined to encompass allowed variation between
said user chosen location or said portion of: text character or graphic element, as represented on the touch screen, and
said user selected positional location,
to compensate for human error.

40. The computing device according to claim 25 wherein said one or more operations are configured to automatically apply said user chosen command to one of: insert, select, delete, copy, change an attribute of or move, at least one: text character or graphic element.

41. The computing device according to claim 26 wherein said user chosen location is further determined based on:
said portion of: text character or graphic element, as represented on the touch screen being a closest portion of: text character or graphic element, represented on the touch screen that is within the region to said user selected positional location, or
said user chosen location as represented on the touch screen being a closest location represented on the touch screen within the region to said user selected positional location, wherein said closest location being within document locations of which each is capable of being applied at by said user chosen command.

42. The computing device according to claim 26 wherein said region is a computed region based on:
at least one of said plurality of document locations as represented on the touch screen or
at least one portion of: text character or graphic element, as represented on the touch screen,
being within said computed region.

43. The computing device according to claim 26 wherein the region is defined to encompass allowed variation between
said user chosen location or said portion of: text character or graphic element, as represented on the touch screen, and
said user selected positional location,
to compensate for human error.

44. The computing device according to claim 26 wherein said one or more operations are configured to automatically apply said user chosen command to one of: insert, select, delete, copy, change an attribute of, cut or move, at least one: text character or graphic element.

* * * * *